US 8,398,242 B2

(12) United States Patent
Yamamoto et al.

(10) Patent No.: US 8,398,242 B2
(45) Date of Patent: Mar. 19, 2013

(54) DISPLAY APPARATUS

(75) Inventors: Kakuya Yamamoto, Hyogo (JP);
Kenichi Kasazumi, Osaka (JP); Tatsuo Itoh, Osaka (JP); Akira Kurozuka, Osaka (JP); Keiji Sugiyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/553,013

(22) Filed: Jul. 19, 2012

(65) Prior Publication Data

US 2012/0280956 A1      Nov. 8, 2012

Related U.S. Application Data

(62) Division of application No. 12/523,784, filed as application No. PCT/JP2008/003445 on Nov. 21, 2008, now Pat. No. 8,246,170.

(30) Foreign Application Priority Data

Nov. 21, 2007  (JP) .................. 2007-301487
Dec. 3, 2007   (JP) .................. 2007-312101
Jan. 23, 2008  (JP) .................. 2008-012265
Apr. 23, 2008  (JP) .................. 2008-112341

(51) Int. Cl.
*G03B 21/26* (2006.01)
*G02B 27/14* (2006.01)
*G09G 5/00* (2006.01)

(52) U.S. Cl. .................. 353/28; 359/630; 345/8

(58) Field of Classification Search .......... 345/7, 8, 345/9; 359/630, 631, 632, 633, 13, 14; 349/11, 349/13, 14; 434/373
See application file for complete search history.

(56) References Cited

U.S. PATENT DOCUMENTS

| 5,355,181 A | 10/1994 | Ashizaki et al. |
| 5,508,759 A | 4/1996 | Konishi et al. |
| 6,043,799 A | 3/2000 | Tidwell |
| 6,563,626 B1 | 5/2003 | Iwasaki |
| 7,589,902 B2 | 9/2009 | Garoutte et al. |
| 2007/0171370 A1 | 7/2007 | Watanabe |

FOREIGN PATENT DOCUMENTS

| JP | 10-301055 | 11/1998 |
| JP | 2932636 | 8/1999 |
| JP | 2995876 | 12/1999 |
| JP | 2000-249971 | 9/2000 |
| JP | 2002-277822 | 9/2002 |
| JP | 2002-303819 | 10/2002 |
| JP | 3425818 | 7/2003 |
| JP | 2004-157173 | 6/2004 |
| JP | 2006-39271 | 2/2006 |
| JP | 2006-251126 | 9/2006 |

OTHER PUBLICATIONS

International Search Report issued Dec. 16, 2008 in International Application No. PCT/JP2008/003445.

*Primary Examiner* — William C Dowling
*Assistant Examiner* — Ryan Howard
(74) *Attorney, Agent, or Firm* — Wenderoth, Lind & Ponack, L.L.P.

(57) ABSTRACT

A display apparatus that displays an image on a retina of a user, the display apparatus comprising: an image output unit (100) which includes a light source (101, 110), a wavefront shape change unit (102, 109), and a scan unit (103, 108) and is configured to output display light for displaying the image; and a deflection unit (104, 107) configured to deflect, toward an eye of the user, the display light outputted by the image output unit (100). The deflection unit (104, 107) has a deflection characteristic of suppressing image distortion caused by a change in relative position of the deflection unit (104, 107) with respect to a pupil of the user.

12 Claims, 21 Drawing Sheets

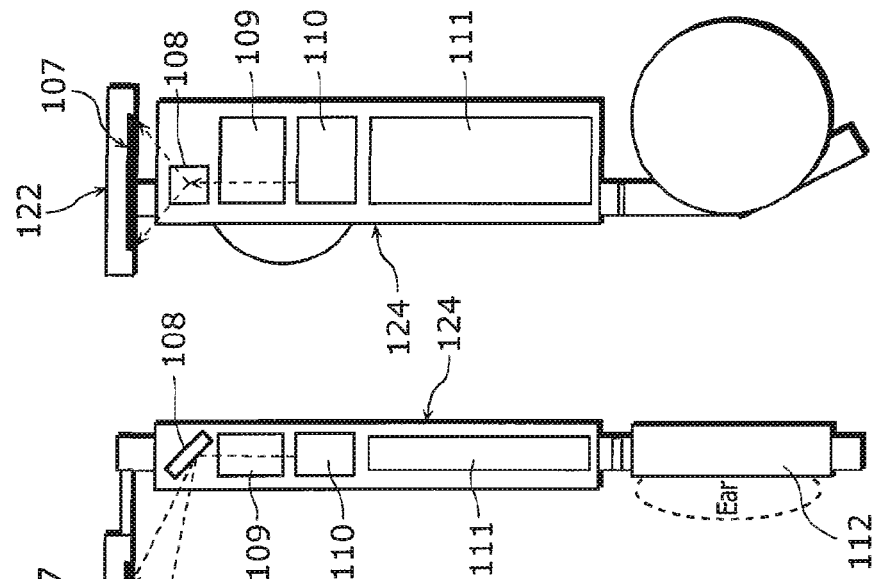
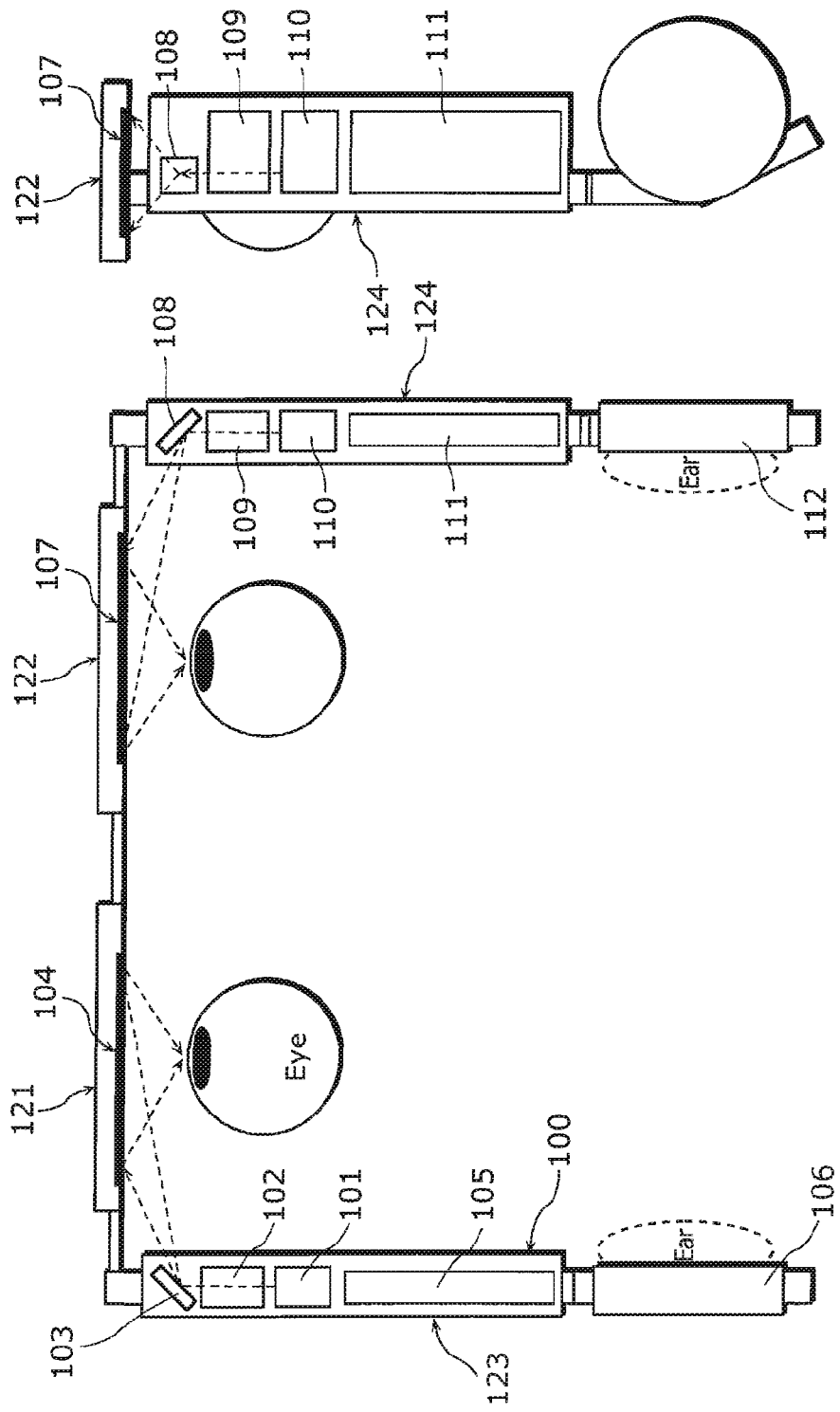

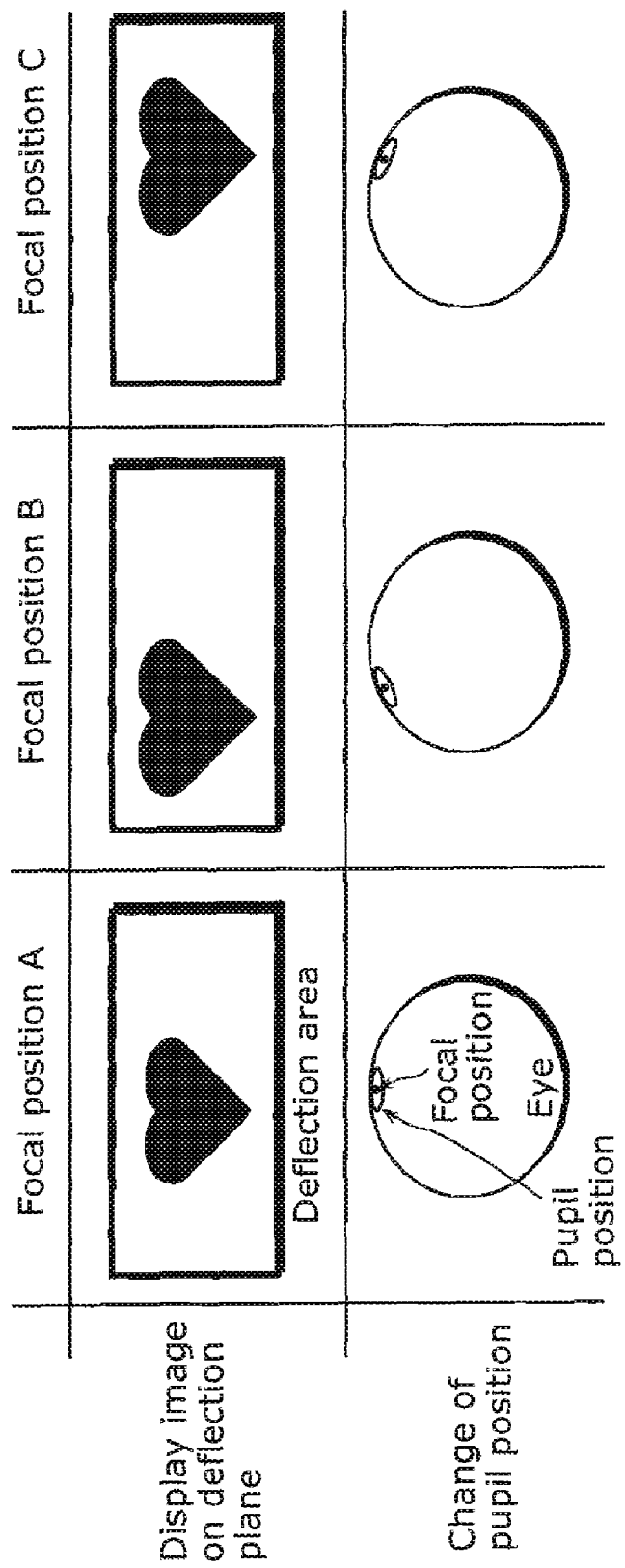

DISPLAY APPARATUS

This application is a divisional of application Ser. No. 12/523,784 file Jul. 20, 2009, now U.S. Pat. No. 8,246,170 which is the National Stage of International Application No. PCT/JP2008/003445, filed Nov. 21, 2008.

TECHNICAL FIELD

The present invention relates to a display apparatus such as a head-mounted display (HMD).

BACKGROUND ART

One of conventional methods used for display apparatuses such as head-mounted displays (HMDs) is a method of directly drawing images on the retinas of the user's eyes by two-dimensionally scanning laser beams (hereinafter described as a laser scanning method) (for example, see Patent Reference 1). The display apparatus according to the laser scanning method is also known as a retinal scanning display, retinal irradiation display, retinal direct-drawing display, laser scanning display (RSD), direct-view-type display, virtual retinal display (VRD), and so on.

HMDs according to the laser scanning method generally include a scan unit which two-dimensionally scans laser beams emitted from a laser light source, and a deflection mirror, such as a lens or a mirror provided in front of the user's eyes, which deflects the beams toward the user's pupils so that the beams pass through the pupils and draw images on the retinas. Here, a point, near the user's pupils, at which the beams deflected by the deflection mirror are focused is hereinafter described as a "deflection focal point". The terms "focal point" and "focal position" are also described as having the same meaning as the deflection focal point.

A rotation of the user's eyeballs without a movement of the head, as in the case of the user looking sideways, causes a change in the positional relationship between the user's pupils and the HMD mounted on the head. When this causes misalignment between a deflection focal point and the pupil position, the beams deflected by the deflection mirrors do not pass through the pupils, resulting in a situation where images cannot be drawn on the user's retinas. (Hereinafter, this situation is referred to as "pupil misalignment" or "pupil misalignment caused by eyeball rotation".) The occurrence of the pupil misalignment depends on whether or not the beams, the diameter of which is usually 2 to 3 millimeters approximately, can pass through the user's pupils.

FIGS. 23 and 24 are explanatory diagrams of a pupil misalignment. When the deflection focal point is on the user's pupil as shown in FIG. 23, the beams deflected by the deflection mirror can pass through the user's pupil, which means that the pupil misalignment does not occur and images can be drawn on the retina. However, when the user's eyeball rotates to the left as shown in FIG. 24, the deflection focal point falls outside the pupil, thereby causing the pupil misalignment and thus images cannot be drawn on the retina.

In the case where the diameter of the user's pupil is 3 millimeters, for example, the pupil misalignment occurs when the pupil moves 1.5 millimeters or more, thereby hindering the user from viewing images. A trial calculation of the screen's view angle in the case of the pupil moving 1.5 millimeters shows that the display screen's view angle is approximately 14 degrees on each side (approximately 27 degrees in total for the left and right sides, and the same applies to the upper and lower sides) in the case where the distance between the user's pupil and the deflection mirror is 15 millimeters and the distance between the pupil and the rotation center of the user's eyeball is 10.5 millimeters. The pupil misalignment occurs when the user's line of sight moves outside such a range.

It is to be noted that FIGS. 23 and 24 are simplified diagrams illustrating the impact on beam refraction in a simplified manner. The impact on the beam refraction is illustrated in a simplified manner because, although the beams entering the user's eye are, in reality, refracted with the impact of the cornea, crystalline lens, and so on, what is important in this description is whether or not the beams can pass through the pupil.

As a countermeasure against the pupil misalignment, there is a method of providing the deflection mirror with plural deflection focal points (see Patent Reference 2, for example). As shown in FIG. 25, the deflection mirror having two deflection focal points prevents the pupil misalignment in some cases because even when the user's pupil moves to the left, a different deflection focal point falls on the pupil.

Further, an image display apparatus used in a head-mounted display and so on is an image display apparatus that is one form of personal, mobile display terminal apparatuses. To be wearable, such an image display apparatus generally has an eyeglass or monocular structure. With such an eyeglass-type head-mounted display, it is often the case that the user visually recognizes an output image of the image display apparatus and, at the same time, a background image which is seen through a portion of the image display apparatus corresponding to an eyeglass lens. In such a case of viewing the output image of the image display apparatus and the background image at the same time in an integrated manner, a solution of the problems below is desired.

To allow the user to view the output image, or a virtual image, and the background image in an integrated manner while preserving the function as eyeglasses, it is necessary for the image display apparatus to have an optical system that includes one or more half mirrors, and a lens or a concave mirror for forming virtual images. Consequently, there is a problem that the size and weight of such an image display apparatus makes it difficult for the user to use the apparatus for a long time. In addition, to pursue high-resolution output images, the image display apparatus becomes larger, resulting in a heavier burden on the user. Thus, in order to solve such problems, the image display apparatus used in a head-mounted display and so on is desired to be small and light-weight while being capable of displaying high-resolution images.

As an eyeglass-type image display apparatus as above, a retinal scanning or laser scanning image display apparatus has been proposed which uses a small, light-weight, and low-power-consuming laser diode array for the light source and which includes a Lippmann-Bragg volumetric hologram sheet capable of providing the optical system with multiple optical functions (see Patent Reference 3, for example). The left and right temples of the eyeglasses are provided with a small optical system such as a light source and a galvanometer mirror, a small driving circuit, and so on, to achieve miniaturization and a lighter weight of the image display apparatus.

When an output image is to be viewed using such an eyeglass-type image display apparatus, a situation sometimes arises in which a ray of light projected onto the user's pupil is shielded by the iris and thus the visual field is narrowed, hindering the user from viewing the entire or a part of the output image or causing uneven luminance in the image.

In view of this, a high-luminance white LED is used as a point light source, and a scattering plate is provided in the optical system, so that a light bundle from a spatial light modulator of the image display apparatus spreads widely, thereby broadening the width of the light bundle at a location in the vicinity of the user's pupil. An image display apparatus has been proposed which is, as a result of the above, capable of reliably guiding the light bundle from the spatial light modulator into the user's pupil even when the eyeball slightly shifts from a predetermined position, thereby preventing a narrow visual field and the unevenness in luminance (see Patent Reference 4, for example).

The occurrence of the pupil misalignment depends on whether or not the beams, the diameter of which is usually 2 to 3 millimeters approximately, can pass through the user's pupils. Therefore, the larger the angle of view (viewing angle) of images displayed by an HMD is, the larger the rotation angle of eyeball rotation is like to be, and the more likely it is that the pupil misalignment occurs. On the other hand, when the screen on which the HMD displays images is small and thus the screen's view angle is small, the rotation angle of an eyeball rotation for viewing an edge of the screen is relatively small, which means that the pupil misalignment is less likely to occur.

FIG. 26 is an explanatory diagram of a pupil misalignment. When the user's pupil is at a pupil position A, the pupil misalignment does not occur as long as the beams deflected by the deflection mirror (deflection unit) pass through a focal point A. In this case, the user can view images. However, when an eyeball rotation causes the pupil to move to a pupil position B, the pupil misalignment occurs because the beams focused on the focal point A cannot pass through the pupil. In this case, the user cannot view images.

As a countermeasure against the pupil misalignment, there is a method of providing the deflection unit with plural focal points (see Patent Reference 2, for example). In FIG. 26, in the case where the deflection mirror has two focal points A and B, the beams focused on the focal point A when the user's pupil is at the pupil position A, and the beams focused on the focal point B when the user's pupil is at the pupil position B both reach the retina. As a result, the pupil misalignment does not occur.

Moreover, to detect the user's line of sight, there is a method of using reflection of infrared light projected onto the user's eyes (for example, see Patent Reference 5), and a method of using reflection of a laser beam scanned on the user's eyes (for example, see Patent Reference 6).

Patent Reference 1: Japanese Patent No. 2932636
Patent Reference 2: U.S. Pat. No. 6,043,799
Patent Reference 3: Japanese Unexamined Patent Application Publication No. 10-301055
Patent Reference 4: Japanese Unexamined Patent Application Publication No. 2000-249971
Patent Reference 5: Japanese Patent No. 2995876
Patent Reference 6: Japanese Patent No. 3425818

DISCLOSURE OF INVENTION

Problems that Invention is to Solve

There are many problems with the method of providing plural deflection focal points as a countermeasure against the pupil misalignment as shown in Patent Reference 2 and FIG. 25. For example, when it becomes dark around the user, causing an increase in the user's pupil size, there are cases where two or more deflection focal points fall on the pupil at the same time, thereby causing a problem that an image is doubly drawn at different positions of the retina, and thus the image quality deteriorates. When the user's pupil size decreases, however, there is also a problem that none of the deflection focal points falls on the pupil, thereby resulting in the pupil misalignment.

In addition, in order to prevent the pupil misalignment even when the user's eyeball rotates in different directions such as up, down, left, or right, it is necessary to provide a deflection focal point for each of those directions, creating a need to provide five deflection focal points in total. Considering other directions such as upper left and lower right, there may be a need to provide nine or more deflection focal points.

When plural deflection focal points are provided, one beam is divided into plural branches by the deflection mirror or the like, and only one of them is allowed to pass through the user's pupil. As a consequence, there is a problem of lower efficiency for light utilization. Therefore, it becomes necessary to provide a high-power laser light source for compensating the efficiency, which could lead to a problem of increased power consumption. Furthermore, the provision of plural deflection focal points also entails a problem of complicating the method for manufacturing the deflection mirror, and a problem of deteriorating the characteristics of the deflection mirror, such as the deflection efficiency, transmittance, thickness, and temperature characteristics. Providing plural scan mirrors or the like in an attempt to reduce such characteristic deterioration could lead to a problem of complicating the display apparatus as a whole.

In addition, with the conventional techniques such as Patent Reference 4 described above, when the user of the image display apparatus who is viewing, with the eyeballs facing the front, the center of an image integrating a background image and an output image, intends to view an area around the integrated image by rotating the eyeballs, there is a problem that the light opposite to the integrated image partially falls outside the user's pupils and disappears or becomes missing.

The conventional techniques disclose adjusting the position of the image to the position facing the user's eyes, based on the premise that the user faces the front. However, they do not disclose a solution of the problem of the missing image that occurs when the user's pupils move up, down, left, or right. They do not mention such a problem either.

In addition, the method of providing the deflection mirror with plural focal points near the user's pupil as a countermeasure against the pupil misalignment entails a problem that the display position and display size of images change when an eyeball rotation causes beams from a different focal point to pass through the pupil.

FIG. 27 is an explanatory diagram of this problem. In the case where a deflection mirror has two focal points A and B, beams from a deflecting position A reach both the focal points A and B. As a result, when the user's pupil is at a pupil position A, the beams focused on the focal point A allow an image to be viewed, whereas when the user's pupil is at a pupil position B, the beams focused on the focal point B allow the image to be viewed.

There is a problem, however, that the orientation of the displayed image changes due to a difference between the direction from the deflecting position A toward the focal point A and the direction from the deflecting position B toward the focal point B. When the user's pupil is at the pupil position A, the image displayed by the beams deflected from the deflecting position A is perceived by the user as an image from a "direction A1" shown in FIG. 27. Then, when the user turns the eye to move the pupil to a pupil position B, the user expects to see the same image in a "direction A2" which is the same direction as the "direction A1". In reality, however, the user sees the image in a different direction, "direction B", and thus uncomfortably feels that the display position has changed.

The reason why the user expects to see the image in the same direction as the direction A1 lies in the distance between the user's eye and the virtual screen (the distance between the user's eye and the virtual position of a displayed object). With HMDs, the distance between the user's eye and the deflection mirror is usually 1 to 5 centimeters approximately. However, HMDs are often optically designed such that the distance between the user's eye and the virtual screen is between a few meters and infinity. Thus, there is a difference between these distances. This is due to the constraints of the function of eyes to adjust the focal point, and eye strain generally tends to decrease when the distance between the user's eyes and the virtual screen is at infinity. Assuming that the virtual screen is at infinity, the directions from infinity to the focal point A and to the focal point B become parallel. Thus, when the user turns the eye to move the pupil from the pupil position A to the pupil position B, the user expects to see the same image in the "direction A2" which is the same as the "direction A1".

In addition, there is also a problem that the switching between the focal points causes, not only a change in the display position, but also a change in the display size. An eyeball rotation causing switching from the focal point A to the focal point B gives the user an impression that the display size has changed, because the distance between the deflecting position A and the focal point A differs from the distance between the deflecting position A and the focal point B. An increase in the distance between the focal point and the deflection mirror makes the display size look smaller, whereas a decrease in the distance makes the display size look larger.

Such changes in the display position and display size are serious problems with HMDs because these changes look more significant as the deflection mirror is closer to the user's eyes.

Furthermore, when an HMD is an eyeglass-type HMD, there is a problem of "sliding down of eyeglasses" as in the case of eyeglasses. The "sliding down of eyeglasses" is a phenomenon that the lens portion of eyeglasses gradually shifts downward when the eyeglasses are worn with the support of the user's nose and ears. The sliding down of eyeglasses causes such problems as a distortion of the field of view that is seen through the lenses, the user's discomfort, and a change in the impression of the user's face.

In the case of an eyeglass-type HMD, the sliding down of eyeglasses causes a change in the positional relationship between the lens portion (deflection mirror) and the user's pupil, resulting in a change in the positional relationship between the focal position and the pupil. As a consequence, a situation could arise in which beams cannot pass through the user's pupil and thus images cannot be drawn on the retina (hereinafter, this situation is referred to as "pupil misalignment caused by wearing the apparatus").

This problem of "pupil misalignment caused by wearing the apparatus" is different from the pupil misalignment caused by eyeball rotation in terms of the amount and direction of the change, and thus cannot be adequately solved by the countermeasure against the pupil misalignment caused by eyeball rotation as disclosed in Patent Reference 2.

In view of the above, the present invention aims at providing a display apparatus, such as beam-scan display apparatus like an HMD, which is capable of reducing problems of the pupil misalignment without having plural deflection focal points.

Further, the present invention is to solve the above described conventional problems, and aims at providing an image display apparatus with which missing of images and so on is less likely occur even when the user's pupil position changes as the user viewing the center of an image intends to view an area around the image by simply rotating the eyeballs in an up, down, left, or right direction without moving the head.

Furthermore, the present invention aims at providing a display apparatus which, in the case where the deflection mirror deflects display light toward plural focal positions so as to adapt to a change in the user's pupil position caused by eyeball rotation, solves the problem of a change in the position or size of a displayed image, caused by switching between the plural focal positions corresponding to the user's pupil position.

In addition, the present invention aims at providing a display apparatus which solves the problem of not allowing the user to view images due to "pupil misalignment caused by wearing the apparatus" when eyeglasses of an eyeglass-type HMD slide down.

Means to Solve the Problems

The display apparatus according to an aspect of the present invention is a display apparatus that displays an image on a retina of a user, the display apparatus comprising: an image output unit configured to output display light for displaying the image; and a deflection unit configured to deflect, toward an eye of the user, the display light outputted by the image output unit. The deflection unit has a deflection characteristic of suppressing image distortion caused by a change in relative position of the deflection unit with respect to a pupil of the user. This structure makes an HMD capable of changing and adjusting the condition for the pupil misalignment occurrence, by appropriately setting a part of an area, thereby reducing the problem of pupil misalignment.

Further, the image output unit includes a light source which emits a beam for drawing each of pixels constituting the image, and a scan unit configured to two-dimensionally scan the beam emitted from the light source. The deflection unit may have a deflection characteristic of deflecting the beam scanned by the scan unit such that at least a portion of the beam passes through the user's pupil at a position other than a center of the user's pupil.

The deflection unit may have a deflection characteristic of deflecting the beam scanned by the scan unit such that the beam passes through different positions on the user's pupil depending on an incidence angle at which the beam enters the user's pupil.

This structure allows a beam-scan display apparatus, such as an HMD, to be capable of reducing the problem of pupil misalignment without having plural deflection focal points. Since there is no need to provide plural deflection focal points, it is also possible to prevent the above described problems involved with plural deflection focal points, such as: doubly drawing images on the user's retina; lower efficiency for beam utilization; the need of a high-power light source; higher power consumption; complication of the method for manufacturing the deflection unit; deterioration of the characteristics of the deflection unit; and complication of the display apparatus as a whole.

Furthermore, the deflection unit may have a deflection characteristic of deflecting the beam such that: a beam scanned on a left deflection area, which is on the left of a virtual line, passes through an area of the user's pupil on the left of the pupil center; and a beam scanned on a right deflection area, which is on the right of the virtual line, passes through an area of the user's pupil on the right of the pupil center, the virtual line extending through the pupil center and being perpendicular to the deflection unit.

This structure makes it possible to increase, toward the left side of the screen, the rotation angle that does not cause the pupil misalignment even when the user's eyeballs rotate to the left, as compared with the conventional method of having the deflection focal point at the pupil center. In the example illustrated in the above Background Art, the rotation angle that does not cause the pupil misalignment can be increased from 14 degrees approximately to 26 degrees approximately. Likewise, it is possible to increase, toward the right side of the screen, the rotation angle that does not cause the pupil misalignment even when the user's eyeballs rotate to the right.

Moreover, the deflection unit may have a deflection characteristic of deflecting the beam such that the beam scanned on the left deflection area and the beam scanned on the right deflection area are bilaterally asymmetric with respect to the virtual line in incidence angle at which the beam enters the user's pupil and distance between the pupil center and an incidence position at which the beam enters the user's pupil. This structure creates a difference, between the left and right sides of the screen, in the eyeball rotation angle that allows the user to continuously view images. Therefore, use of different deflection units for the left and right eyes makes it possible to enlarge the range that the user can continuously view images with at least one of the user's eyes.

Further, the deflection unit includes a left-eye deflection unit configured to deflect, toward the user's left eye, the beam scanned by the scan unit, and a right-eye deflection unit configured to deflect, toward the user's right eye, the beam scanned by the scan unit. The left-eye deflection unit may have a deflection characteristic of deflecting the beam such that: an incidence angle at which the beam scanned on the left deflection area enters the user's pupil is smaller than an incidence angle at which the beam scanned on the right deflection area enters the user's pupil; and a distance between the pupil center and an incidence position at which the beam scanned on the left deflection area enters the user's pupil is longer than a distance between the pupil center and an incidence position at which the beam scanned on the right deflection area enters the user's pupil, and the right-eye deflection unit may have a deflection characteristic of deflecting the beam such that: an incidence angle at which the beam scanned on the right deflection area enters the user's pupil is smaller than an incidence angle at which the beam scanned on the left deflection area enters the user's pupil; and a distance between the pupil center and an incidence position at which the beam scanned on the right deflection area enters the user's pupil is longer than a distance between the pupil center and an incidence position at which the beam scanned on the left deflection area enters the user's pupil.

This structure makes it possible to increase the eyeball rotation angle that allows the user to continuously view images with the left eye when the user's line of sight moves to the left. Likewise, it is possible to increase the eyeball rotation angle that allows the user to continuously view images with the right eye when the user's line of sight moves to the right.

Furthermore, the deflection unit may have a deflection characteristic of deflecting the beam such that: the beam scanned on an upper deflection area, which is above the virtual line, passes through an area of the user's pupil above the pupil center; and the beam scanned on a lower deflection area, which is below the virtual line, passes through an area of the user's pupil below the pupil center.

This structure makes it possible to increase, toward the upper side of the screen, the rotation angle that does not cause the pupil misalignment even when the user's eyeballs rotate to the upper side, as compared with the conventional method of having the deflection focal point at the pupil center. In the example illustrated in the above Background Art, the rotation angle that does not cause the pupil misalignment can be increased from 14 degrees approximately to 26 degrees approximately. Likewise, it is possible to increase, toward the lower side of the screen, the rotation angle that does not cause the pupil misalignment even when the user's eyeballs rotate to the lower side.

Furthermore, the deflection unit may be a hologram which deflects the beam by diffraction. This structure allows the deflection unit in front of the user's eye to be thinner and transparent.

Further, the deflection unit includes a left-eye deflection unit configured to deflect, toward the user's left eye, the beam scanned by the scan unit, and a right-eye deflection unit configured to deflect, toward the user's right eye, the beam scanned by the scan unit. The left-eye and right-eye deflection units may be provided in such a positional relationship that a pupil-to-pupil distance and a focus-to-focus distance are different from each other, the pupil-to-pupil distance being a distance between a pupil center of the user's left eye and a pupil center of the user's right eye, and the focus-to-focus distance being a distance between a beam focusing position on the user's left eye and a beam focusing position on the user's right eye.

Such a structure allows the user to view images with at least one of the user's eyes when an eyeball rotation causes a movement of the pupil, thereby making it possible to provide a display apparatus with which missing of the image output and so on does not occur.

In addition, the display apparatus may further comprise a deflection unit position adjustment unit configured to move the left-eye and right-eye deflection units such that the pupil-to-pupil distance and the focus-to-focus distance are different from each other.

Such a structure makes it possible, even when a user having a different pupil-to-pupil distance uses the same display apparatus of the present invention, to easily move the left and right deflection units to the positions facing the user's eyes by using the deflection unit position adjustment unit. Accordingly, the deflection units can be appropriately set for each individual user using the display apparatus, thereby allowing each user to view images without missing of image output, and so on.

Moreover, the display apparatus may further comprise a light detection unit configured to detect light reflected from the pupils of the user's left and right eyes; and a deflection unit position control unit configured to calculate the pupil-to-pupil distance based on the detection by the light detection unit, and to cause the deflection unit position adjustment unit to move the left-eye and right-eye deflection units such that the focus-to-focus distance is different from the pupil-to-pupil distance calculated.

Moreover, the display apparatus may further comprise a beam amount control unit configured to cause the light source to increase an amount of the beam deflected by one of the left-eye deflection unit and the right-eye deflection unit when the beam amount control unit determines based on the detection by the light detection unit that the beam deflected by the other one of the left-eye deflection unit and the right-eye deflection unit has not entered an eyeball of the user.

Such a structure allows the user to view images with appropriate brightness by controlling the increase/decrease of the amount of the emitted beam based on information indicating determination as to which of the user's eyes is used for viewing images, or whether both of the user's eyes are used for viewing images, which are determined based on a pupil position detected on the basis of the intensity of light reflected from the surfaces of both of the user's eyeballs.

Further, the light detection unit may be configured to detect the reflected light by separating the reflected light according to a predetermined wavelength. Such a structure allows detection of the color of irises which differs among individual users, thereby enabling precise detection of whether or not light is shielded by the user's iris.

Further, the image output unit includes a light source which emits a beam for drawing each of pixels constituting the image, and a scan unit configured to two-dimensionally scan the beam emitted from the light source. The deflection unit includes a left-eye deflection unit configured to deflect, toward the user's left eye, the beam scanned by the scan unit, and a right-eye deflection unit configured to deflect, toward the user's right eye, the beam scanned by the scan unit. The left-eye deflection unit may have a deflection characteristic of deflecting the beam such that the beam scanned on a left deflection area which is on the left of a virtual line and the beam scanned on a right deflection area which is on the right of the virtual line are bilaterally asymmetric with respect to the virtual line in incidence angle at which the beams enter the user's pupil, the virtual line extending through a center of the user's pupil and being perpendicular to the left-eye deflection unit, and the right-eye deflection unit may have a deflection characteristic of deflecting the beam such that the beam scanned on a left deflection area which is on the left of a virtual line and the beam scanned on a right deflection area which is on the right of the virtual line are bilaterally asymmetric with respect to the virtual line in incidence angle at which the beams enter the user's pupil, the virtual line extending through the pupil center and being perpendicular to the right-eye deflection unit.

Such a structure allows the user to view the image with at least one of the user's eyes when an eyeball rotation causes a pupil movement. This, as a result, makes it possible to provide a display apparatus with which missing of the image output and so on does not occur, thereby allowing the user to view the whole image outputted by the image output unit.

Furthermore, the image output unit includes a light source which emits a beam for drawing each of pixels constituting the image, and a scan unit configured to two-dimensionally scan the beam emitted from the light source. The deflection unit may have a deflection characteristic of deflecting the beam scanned by the scan unit such that beams are focused on a first focal point and a second focal point different from the first focal point.

Moreover, the display apparatus may further comprise a light detection unit configured to detect light reflected from the user's pupil; a pupil position detection unit configured to detect a change in pupil position based on the detection by the light detection unit, the pupil position being a center position of the user's pupil; and a control unit configured to control output of the image output unit such that a virtual image viewed by the user before a change in the pupil position and a virtual image viewed by the user after the change in the pupil position are seen in a same direction when the detection by the pupil position detection unit shows that the pupil position has moved from a position including the first focal point to a position including the second focal point.

This structure allows reduction in changes in the position or size of a display image which occur when the focal position corresponding to the user's pupil position is switched to another focal position. Further, since such changes in the position or size become more significant as the deflection unit is closer to the user's eye, this structure allows the deflection unit to be placed near the user's eye. Furthermore, as a result of solving the problem with providing the deflection unit with plural focal points as a countermeasure against the pupil misalignment, it is possible to provide an HMD having a larger screen with a wider angle of view, which is likely to cause the pupil misalignment.

Further, the control unit may be configured to control the output of the image output unit such that the beam for drawing pixels before the change in the pupil position and the beam for drawing same pixels after the change in the pupil position are substantially parallel in an area toward the user's eye from the deflection unit.

This structure allows reduction in a rightward shift of the position of a display image which occurs when, for example, the focal position corresponding to the pupil position is switched to another focal position on the left. This structure also allows reduction in a downward shift of the position of a display image which occurs when the focal position corresponding to the pupil position is switched to another focal position located above the current one.

Furthermore, the control unit may include an output image control unit configured to cause the light source to emit, in a shifted direction along which the user's pupil position has changed, the beam for drawing each of the pixels, such that the beam for drawing the pixels before the change in the pupil position and the beam for drawing the same pixels after the change in the pupil position are substantially parallel in the area toward the user's eye from the deflection unit. This structure allows reduction in changes in the position of a display image on a virtual screen at infinity which occur when the focal position corresponding to the pupil position is switched to another focal position.

Moreover, the output image control unit may be further configured to control the output of the image output unit such that a size of the virtual image viewed by the user before the change in the pupil position equals a size of the virtual image viewed by the user after the change in the pupil position. This structure allows reduction in the degree of increase in the size of a display image which occurs when, for example, the focal position corresponding to the pupil position becomes closer to the deflection unit.

Further, the control unit may include a scan angle control unit configured to cause the scan unit to scan, in a shifted direction along which the user's pupil position has changed, the beam for drawing each of the pixels, such that the beam for drawing the pixels before the change in the pupil position and the beam for drawing the same pixels after the change in the pupil position are substantially parallel in the area toward the user's eye from the deflection unit. This structure allows reduction in changes in the position of a display image on a virtual screen at infinity which occur when the focal position corresponding to the pupil position is switched to another focal position.

Further, the deflection unit may have a deflection characteristic of deflecting the beam scanned by the scan unit such that beams are focused on the first and second focal points, the second focal point being above the first focal point with respect to the user and more distant from the deflection unit than the first focal point.

This structure solves the problem of the pupil misalignment caused by wearing the apparatus even when the sliding down of eyeglasses occurs with an eyeglass-type HMD. As a result, the situation where images cannot be viewed is less likely to occur. Further, reducing the problem with the sliding down of eyeglasses makes it possible to provide a heavy HMD, an HMD whose weight balance is at its front (the lens portion), and an HMD having small contact areas near the user's nose or ears, all of which are relatively likely to cause the sliding down of eyeglasses. In addition, since problems with eyeglass-type HMDs can be reduced, HMDs can be eyeglass-type HMDs.

Furthermore, the first and second focal points may be on a virtual line substantially parallel to a ridge line of the user's nose. This structure allows prevention of the pupil misalignment even when the sliding down of eyeglasses causes an eyeglass unit to be more distant from the user's eyes.

Moreover, a vertical distance between the first and second focal points may be equal to or longer than a height of the user's pupil and a horizontal distance between the first and second focal points may be equal to or shorter than a width of the user's pupil. This structure allows reduction in the occurrence of the situation where no beams enter the user's pupil and the situation where plural beams from plural focal points enter the user's pupil, which occur when an eyeglass-type HMD shifts downward with respect to the user's face.

Further, the deflection unit may be configured to simultaneously deflect, toward the first and second focal points, the beam scanned by the scan unit. This allows the sliding down of eyeglasses to be addressed without detection of the sliding down of eyeglasses.

Moreover, the display apparatus may further comprise a relative position detection unit configured to detect a change in relative positions of the deflection unit and a center of the user's pupil with respect to each other; and a scan unit position adjustment unit configured to move a position of the scan unit such that a direction of the beam scanned by the scan unit on the deflection unit changes from a first direction to a second direction different from the first direction when the detection by the relative position detection unit shows that the user's pupil center has moved from a position including the first focal point to a position including the second focal point, wherein the deflection unit is a hologram having a first interference pattern for focusing, at the first focal point, beams incident from the first direction, and a second interference pattern for focusing, at the second focal point, beams incident from the second direction.

This structure allows adaptation to the pupil movement, and thus makes it easier to align the focal point with the pupil position, thereby reducing the occurrence of the pupil misalignment. In addition, since only one focal point is required, there is no need to divide the beam using the deflection unit, thereby enhancing the efficiency for beam utilization. This structure makes it easier to align the focal point with the pupil position, thereby reducing the occurrence of the pupil misalignment.

Further, the relative position detection unit may include: a rotator which is provided at a position to be in contact with the user's nose, and which rotates when the deflection unit makes a vertical movement; and a relative position calculation unit configured to detect a change in the relative positions of the deflection unit and the user's pupil center based on a rotation angle of the rotator.

Effects of the Invention

The display apparatus of the present invention allows an HMD to be capable of reducing the problem of the pupil misalignment, because the deflection unit is given deflection characteristics of suppressing image distortion caused by a change in relative positions of the deflection unit and a user's pupil with respective to each other.

Further, since the deflection unit of the display apparatus of the present invention deflects a beam such that the beam enters the user's pupil at different positions depending on the incidence angle at which the beam enters the pupil, a beam-scan display apparatus such as an HMD can reduce the problem of the pupil misalignment without having plural deflection focal points. Since there is no need to provide plural deflection focal points, it is also possible to prevent problems involved with plural deflection focal points, such as: doubly drawing images on the user's retinas; lower efficiency for beam utilization; the need of a high-power light source; higher power consumption; complication of the method for manufacturing the deflection unit; deterioration of the characteristics of the deflection unit; and complication of the display apparatus as a whole.

Furthermore, the image display apparatus of the present invention can display high-resolution images that are high in luminance and color reproducibility, and allow the user to view images with at least one of the user's eyes even when an eyeball rotation causes a pupil movement. Therefore, it is possible to provide an image display apparatus with which missing of image output and so on does not occur, while being small in size and low in power consumption.

In addition, with the display apparatus of the present invention, in the case where the deflection unit deflects display light toward plural focal positions so as to adapt to a change in the pupil position caused by an eyeball rotation, it is possible to reduce changes in the position or size of a displayed image, which occur when a focal position corresponding to the pupil position is switched to another focal position. Further, since such changes in the position or size become more significant as the deflection unit is closer to the user's eye, this structure allows the deflection unit to be placed near the user's eye. Furthermore, as a result of solving the problem with providing the deflection unit with plural focal points as a countermeasure against the pupil misalignment, it is possible to provide an HMD having a larger screen with a wider angle of view, which is likely to cause the pupil misalignment.

Moreover, the display apparatus of the present invention solves the problem of the pupil misalignment caused by wearing the apparatus even when the sliding down of eyeglasses occurs with an eyeglass-type HMD. As a result, the situation where images cannot be viewed is less likely to occur. Further, reducing problems with the sliding down of eyeglasses makes it possible to provide a heavy HMD, an HMD whose weight balance is at its front (the lens portion), and an HMD having small contact areas near the user's nose or ears, all of which are relatively likely to cause the sliding down of eyeglasses. In addition, since problems with eyeglass-type HMDs can be reduced, HMDs can be eyeglass-type HMDs.

BRIEF DESCRIPTION OF DRAWINGS

FIG. 1A is a plan view of a display apparatus according to Embodiment 1.

FIG. 1B is a side view of a display apparatus according to Embodiment 1.

FIG. 18 illustrates examples of display of a display apparatus, performed when a pupil position changes.

NUMERICAL REFERENCES

Figure 2:
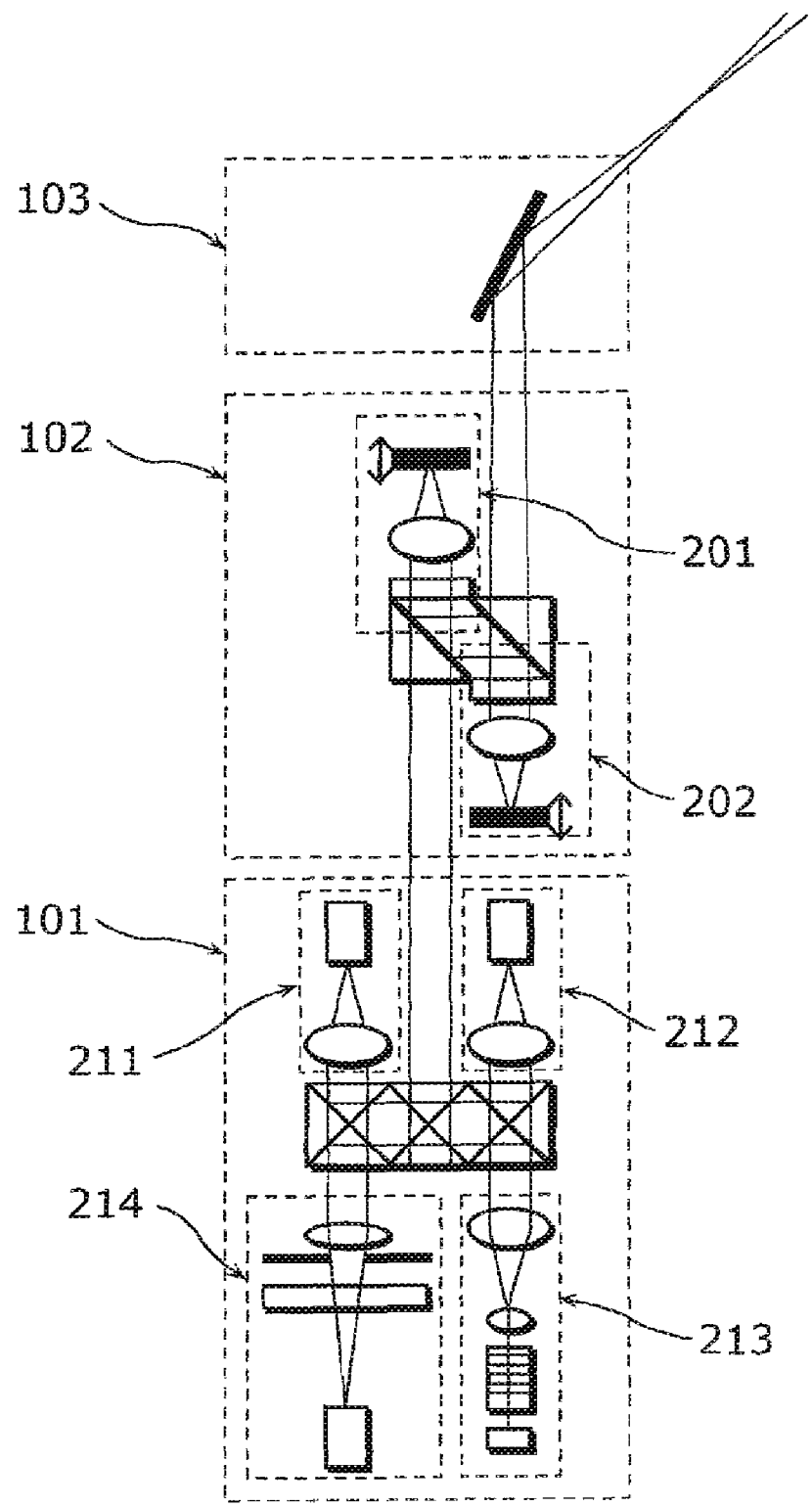
FIG. 2 is a detail structural view of a display apparatus according to Embodiment 1.

2 Emitted beam
2b Reflected light
2B Blue laser light
2G Green laser light
2R Red laser light
4a Movable mirror
6 Overall control unit
7 Pupil
8a Retina
8b Iris
8L Left eye
8R Right eye
9 Pupil-to-pupil distance
10, 30 Display apparatus
11L, 11R Beam focusing position
12 Focus-to-focus distance
13 RGB light source
14 Laser beam
14a Reflecting mirror
14b, 17a, 17b Dichroic mirror
14c Lens
15a Reflecting surface
15L, 15R Hologram mirror
16 Deflection unit position adjustment unit
16L, 16R Driving unit
17c Light-reception control unit
18 Center line
19 Wire
20, 20L, 20R, 32, 32L, 32R Image
31, 31L, 31R Visual field
61 Beam amount control unit
62 Deflection unit position control unit
3L, 3R, 100 Image output unit
1L, 1R, 101, 110 Light source
102, 109 Wavefront shape change unit
4L, 4R, 103, 108 Scan unit
15, 104, 107 Deflection unit
5L, 5R, 105, 111 Control unit
106, 112 Headphone unit
120 Relative position detection unit
121, 122 Lens
123, 124 Temple
201 Focal length horizontal component change unit
202 Focal length vertical component change unit
215 Rotator
13r, 211 Red laser light source
13b, 212 Blue laser light source
13g, 213 Green laser light source
17, 17B, 17G, 17R, 214 Light detection unit
401 Deflection unit support unit
501 Central processing unit
502 Memory unit
503 Input/output control unit
510 Light source input/output control unit
511 Wavefront-shape-change input/output control unit
512 Scan input/output control unit
513 Deflection input/output control unit
514 Headphone input/output control unit
515 Power source input/output control unit
516 Communication input/output control unit
520 Communication unit
801, 802, 803, 804, 805, 806L, 806R Deflection characteristics
1051A Pupil position detection unit
1052A Output image control unit 1053A Scan angle control unit
1051B Relative position calculation unit
1052B Scan unit position adjustment unit

BEST MODE FOR CARRYING OUT THE INVENTION

Hereinafter, embodiments of the present invention shall be described with reference to the drawings.

Embodiment 1

Figure 3:
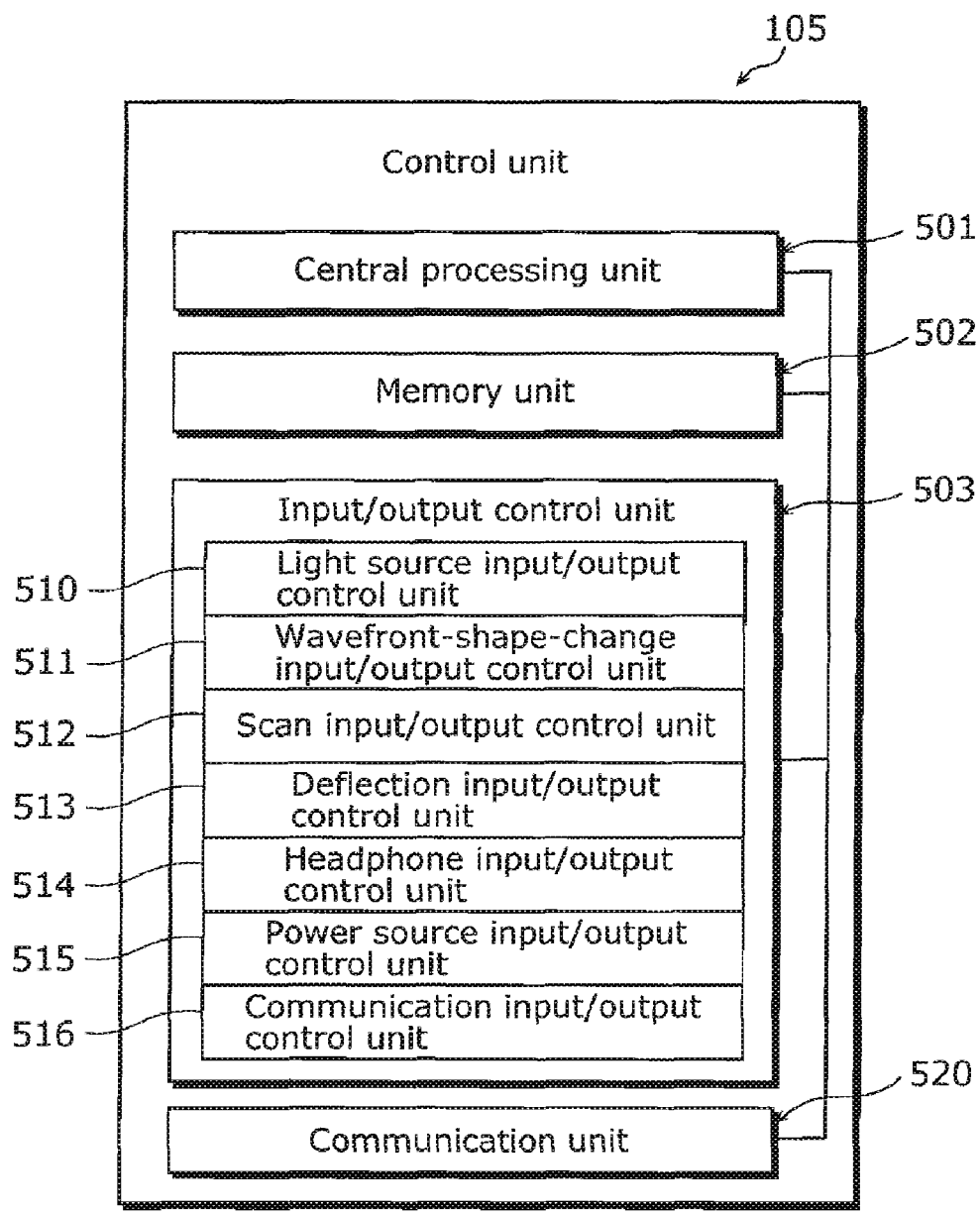
FIG. 3 is a functional block diagram of a display apparatus according to Embodiment 1.

Described hereinafter with reference to FIGS. 1A, 1B, 2 and 3 is an eyeglass-type HMD as a beam-scan display apparatus (also referred to as "image display apparatus" or "display apparatus") according to Embodiment 1 of the present invention. It is to be noted that FIG. 1A is a plan view of the display apparatus, FIG. 1B is a side view of the display apparatus, FIG. 2 is a detail view of a portion of FIG. 1A, and FIG. 3 is a functional block diagram of the display apparatus.

The eyeglass-type HMD according to Embodiment 1 includes: lenses 121 and 122 provided in front of the user's left and right eyes, respectively; and a pair of temples 123 and 124 each having one end connected to a corresponding one of the lenses 121 and 122 and the other end fixed to the user's temporal region.

As shown in FIGS. 1A, 1B, and 2, the display apparatus includes: light sources 101 and 110 which emit beams for drawing each of pixels constituting a display image; wavefront shape change units 102 and 109 which change the wavefront of the beams emitted from the light sources 101 and 110; scan units 103 and 108 which two-dimensionally scan, on deflection units 104 and 107, the beams processed by the wavefront shape change units 102 and 109; deflection units 104 and 107 which deflect, toward the user's eyes, the beams scanned by the scan units 103 and 108; control units 105 and 111 which control each of the aforementioned units; and headphone units 106 and 112.

It is to be noted that the light source 101, wavefront shape change unit 102, and scan unit 103 constitute an image output unit 100 for the user's left eye. Likewise, the light source 110, wavefront shape change unit 109, and scan unit 108 constitute an image output unit for the user's right eye (not shown).

It is to be noted that in the present embodiment, the light sources 101 and 110, wavefront shape change units 102 and 109, scan units 103 and 108, control units 105 and 111, and headphone units 106 and 112 are included in the temples 123 and 124, and the deflection units 104 and 107 are provided on a side of the lenses 121 and 122 facing the user's eyes.

The light source 101 emits a beam. As shown in FIG. 2, the beam emitted is a laser beam obtained by synthesizing laser beams emitted from a red laser light source 211, a blue laser light source 212, and a green laser light source 213. A laser beam of an arbitrary color can be emitted through appropriate modulation of the output from the laser light sources 211, 212, and 213. Furthermore, through modulation in coordination with the wavefront shape change units 102 and 109, scan units 103 and 108, and so on, it is possible to display an image on the retinas of the user's eyes.

In FIG. 2, the red laser light source 211 is a semiconductor laser light source which emits a red laser beam, and the blue laser light source 212 is a semiconductor laser light source which emits a blue laser beam. In contrast, the green laser light source 213 is structured by combining a semiconductor laser light source that emits an infrared ray and a second-harmonic generation (SHG) device that converts the infrared ray into a green laser beam. The green laser light source 213, however, is not limited to this, and it may be a semiconductor laser light source that emits a green laser beam. In addition, each laser light source may also be a solid-state laser, a liquid laser, a gas laser, or a light-emitting diode.

Further, in FIG. 2, laser beams are modulated by each of the laser light sources 211, 212, and 213; however, for modulating the laser beams, an intensity modulation unit which modulates the laser beams emitted from the laser light sources 211, 212, and 213 may be used in combination with the laser light sources 211, 212, and 213. Even the laser light sources 211, 212, and 213 which emit beams at a constant intensity can be applied to the present invention by being combined with the intensity modulation unit.

Through appropriate modulation of the intensities of the beams emitted from the red laser light source 211, blue laser light source 212, and green laser light source 213, the colors, chrominance, and luminance of pixels to be displayed on the user's retinas are represented. In addition to the above modulation control, correction control may be performed which takes into account the impact of the optical system, which includes components from the light source 101 up to the user's eyes, such as the scan unit 103 and the deflecting unit 104. For example, since the beams from the scan unit 103 are obliquely incident on the deflection unit 104, the shape the display area is distorted into a non-rectangular shape, such as trapezium. In view of the above, the light source 101 may control the laser emission in coordination with the scan unit 103 in such a manner that the shape of the display area is inversely corrected in advance to make the display area a rectangle.

The light source 101 may include a light detecting unit 214 shown in FIG. 2. The light detection unit 214 detects the intensity of light reflected from the user's eye. Variations in the intensity of the reflected light allow estimations of the user's line of sight and pupil position.

The wavefront shape change unit 102 changes the wavefront shape of the beam emitted from the light source 101 such that the spot size of the beam deflected by the deflecting unit 104 falls within a predetermined range. The "spot size" of a beam, which is hereinafter described as the spot size on the retina of the user's eye, may be the spot size on the pupil or cornea, or the spot size on the deflection unit 104. The spot size on the retina is the same as the size of a pixel to be displayed. Further, the "wavefront shape" is a three-dimensional shape of a beam wavefront, and includes planar, spherical, or aspherical shapes.

The wavefront shape change unit 102 shown in FIG. 2 has a focal length horizontal component change unit 201 and a focal length vertical component change unit 202 arranged in series on an optical path. This makes it possible to separately change the horizontal and vertical curvatures of the beam. The focal length horizontal component change unit 201 changes the horizontal curvature by changing the distance between a cylindrical lens and a mirror. The focal length vertical component change unit 202 changes the vertical curvature by using a cylindrical lens provided perpendicular to the cylindrical lens of the focal length horizontal component change unit 201. In addition, both the focal length horizontal component change unit 201 and focal length vertical component change unit 202 change the beam diameter along with change of the curvature.

Note that it is possible to adapt to the horizontal change more largely by changing the horizontal curvature more largely than the vertical curvature. This is particularly effective in the case where the horizontal view angle of the screen is intended to be made larger than the vertical view angle, or where the horizontal incidence angle at which the beam is incident on the deflection unit 104 from the scan unit 103 is larger than the vertical incidence angle, as in the case of having the scan unit 103 on the temporal region.

In FIG. 2, of the items representing wavefront shapes, only the horizontal curvature, vertical curvature, and the respective diameters thereof are changed. However, a unit may be provided which changes other items such as the distribution of curvatures within the wavefront, or the shape or size of the wavefront edge. Such a unit produces an advantageous effect of reducing the impact of aberration, leading to an enhanced quality of images displayed.

The wavefront shape change unit 102 in FIG. 2 changes the wavefront shape by using a cylindrical lens and a mirror; however, a variable shape lens such as a liquid-crystal lens and a liquid lens, a diffractive device, or an electro-optic (EO) conversion device may also be used as other means.

The scan unit 103 two-dimensionally scans the beam processed by the wavefront shape change unit 102. The scan unit 103 is a single-plate small mirror which can change angles two-dimensionally. More specifically, the scan unit 103 is a micro-electro-mechanical-system (MEMS) mirror.

It is to be noted that the scan unit 103 may be implemented as a combination of two or more types of scan units, such as a horizontal scan unit and a vertical scan unit. Separately having the horizontal scan unit and the vertical scan unit produces advantageous effects that the oscillation of one of the scan units does not easily influence the other scan unit, and the mechanisms of the scan units can be simplified.

The use of the scan unit 103 is not limited to a method in which the mirror is physically tilted. The scan unit 103 may also be applied to a method in which lenses are moved or diffractive devices are rotated, and a method in which variable shape lenses such as liquid-crystal lenses, or diffractive devices such as acousto-optic (AO) devices and electro-optic (EO) conversion devices are used.

The deflection unit 104 deflects, toward the pupil of the user's eye, the beam scanned by the scan unit 103. The deflection unit 104 is designed so as to diffract, toward the user's eye, the beam scanned by the scan unit 103, by forming, for example, a photopolymer layer on the inner surface of the lens of the eyeglasses and then forming a Lippmann volumetric hologram on the photopolymer layer. In the photopolymer layer, three holograms may be multiply-formed which reflect red, green and blue beams emitted from the respective laser light sources 211, 212, and 213, or a trilayer hologram which corresponds to the beams of the respective colors may be laminated.

Further, it is possible to provide a see-through display by designing it using wavelength selectivity of a hologram such that it diffracts only the light having the wavelength of the light source and does not diffract the light accounting for the major part of the light from the external world and having wavelengths other than the wavelength of the light source. Deflecting the beam through the diffraction by the hologram allows the deflection unit 104 to be thinner.

The hologram can be generated by forming a photopolymer layer on the surface of the lenses 121 and 122 and then exposing the photopolymer layer to an object beam and a reference beam. For example, the deflection units 104 and 107 are irradiated with an object beam from outside the lenses 121 and 122 (above the lenses 121 and 122 in FIG. 1A) and a reference beam from the positions of the scan units 103 and 108. Here, adjustments of the incidence angle and so on of the object beam allows the deflection units 104 and 107 to have various deflection characteristics 801 to 806R shown in FIGS. 6A to 6G.

The control unit 105 includes an integrated circuit that controls each unit of the HMD. As shown in FIG. 3, the control unit 105 may include a central processing unit 501, a memory unit 502, and an input/output control unit 503.

The central processing unit 501 controls the overall processing of the display apparatus by exchanging signals with the memory unit 502 and the input/output control unit 503. The memory unit 502 stores data used by the control unit 105.

The input/output control unit 503 controls input and output of control signals to and from the light source 101, wavefront shape change unit 102, scan unit 103, and so on which are the targets of the control by the control unit 105. The input/output control unit 503 may include a control unit for each of the control targets, namely, a light source input/output control unit 510, a wavefront-shape-change input/output control unit 511, a scan input/output control unit 512, a deflection input/output control unit 513, a headphone input/output control unit 514, a power source input/output control unit 515, and a communication input/output control unit 516, for example. Execution of the input and output processing by the input/output control unit 503 allows reduction in the processing load on the central processing unit 501.

It is to be noted that the control unit 105 may include a communication unit 520 which receives video and audio signals through a wireless connection with a peripheral appliance, such as a mobile phone. This makes the connection between the HMD and the peripheral appliance a wireless connection, thereby allowing the HMD to be worn more usefully and comfortably.

The headphone unit 106 includes a speaker to output audio. It is to be noted that the headphone unit may include a battery for supplying power to each of the units of the display apparatus.

The structures of the light source 110, wavefront shape change unit 109, scan unit 108, deflection unit 107, control unit 111, and headphone unit 112 are common to the structures of the above described light source 101, wavefront shape change unit 102, scan unit 103, deflection unit 104, control unit 105, and headphone unit 106. Thus, the descriptions thereof shall be omitted.

Figure 4:
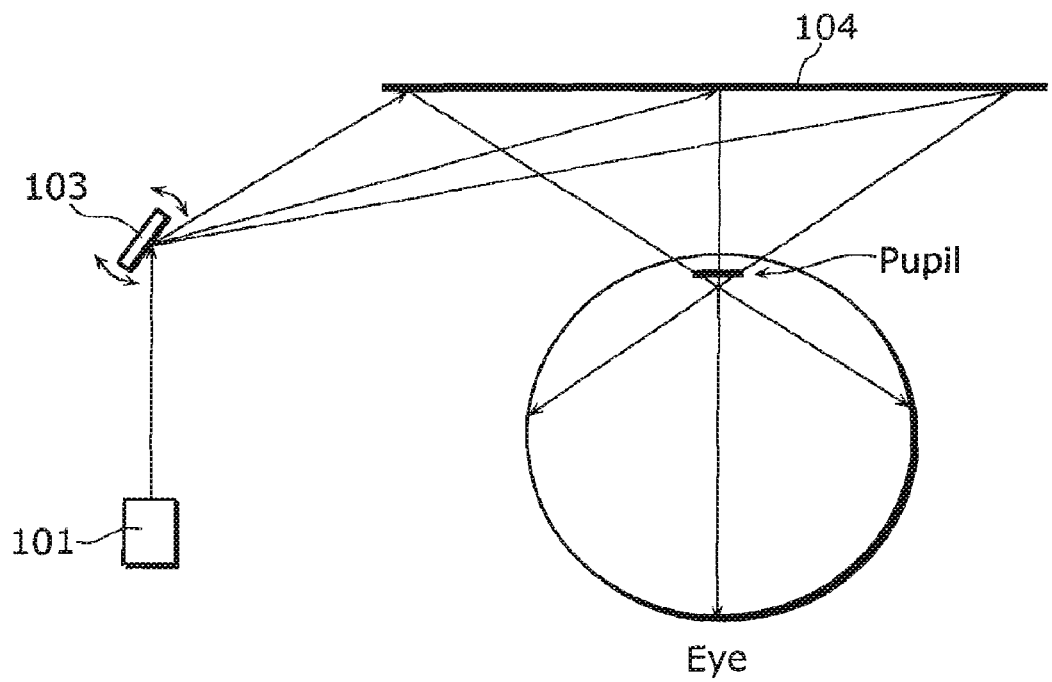
FIG. 4 illustrates a state in which an eye of a user of a display apparatus according to Embodiment 1 faces the front.
Figure 5:
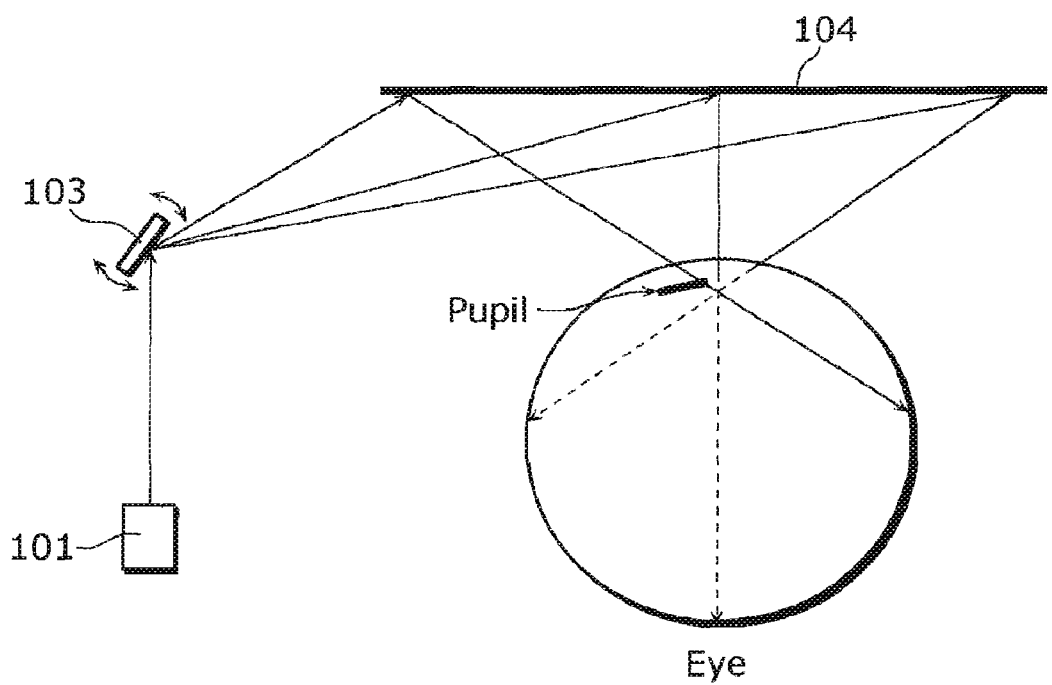
FIG. 5 illustrates a state in which an eye of a user of a display apparatus according to Embodiment 1 faces to the left.
Figure 6:
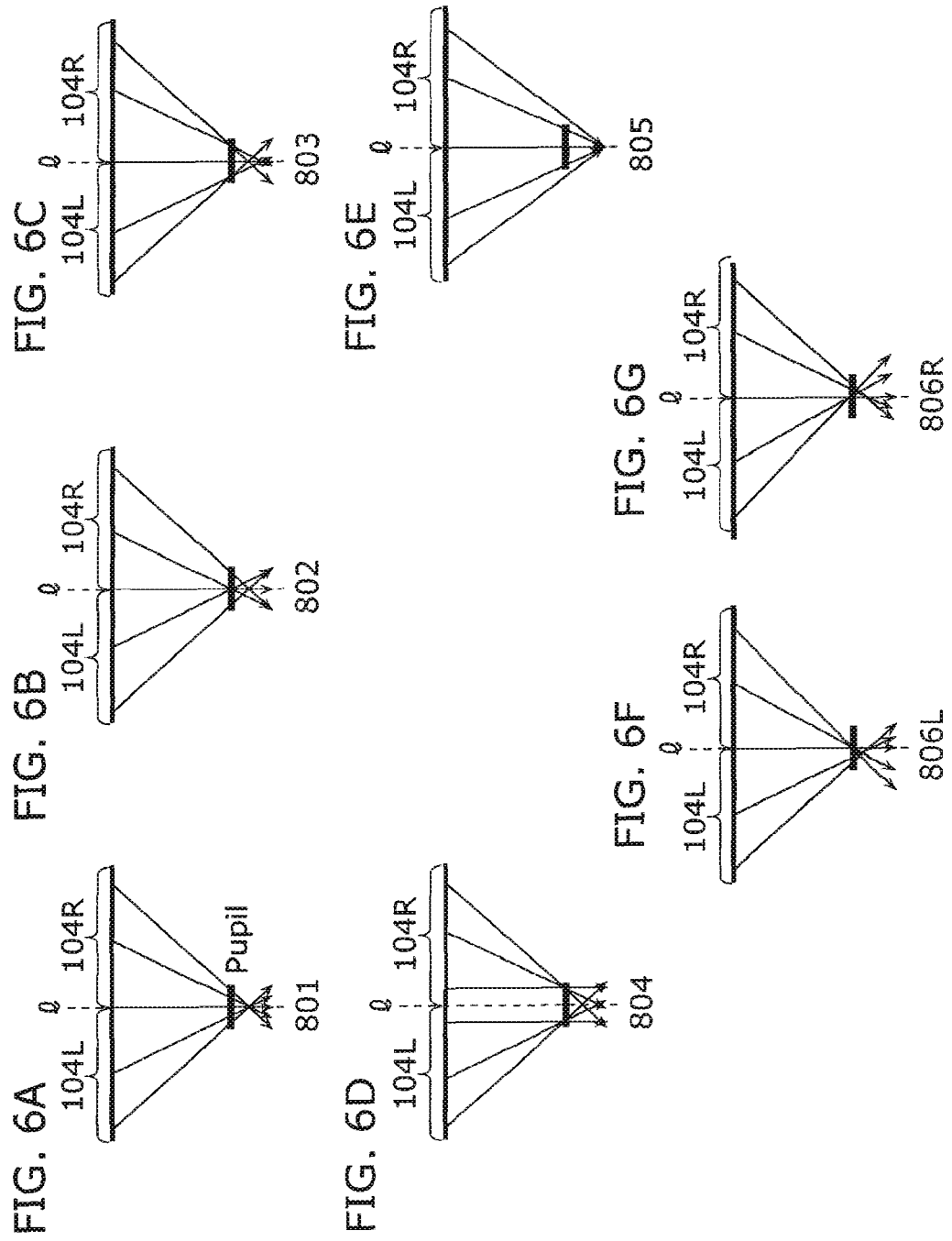
FIG. 6A illustrates an example of deflection characteristics given to a deflection unit.
FIG. 6B illustrates another example of deflection characteristics given to a deflection unit.
FIG. 6C illustrates another example of deflection characteristics given to a deflection unit.
FIG. 6D illustrates another example of deflection characteristics given to a deflection unit.
FIG. 6E illustrates another example of deflection characteristics given to a deflection unit.
FIG. 6F illustrates another example of deflection characteristics given to a deflection unit.
FIG. 6G illustrates another example of deflection characteristics given to a deflection unit.

Described next with reference to FIGS. 4 to 6G are structures of a beam-scan display apparatus according to Embodiment 1 for suppressing distortion of an image viewed by the user when an eyeball rotation causes a change in relative positions of the user's pupil and the deflection unit 104 with respect to each other. FIG. 4 illustrates a state in which the user's eyeball faces the front; FIG. 5 illustrates a state in which the user's eyeball rotates to the left; and FIGS. 6A to 6G illustrate deflection characteristics 801 to 806R given to the deflection units 104 and 107. Although only the deflection unit 104 is described below, the same description holds true for the deflection unit 107.

Figure 23:
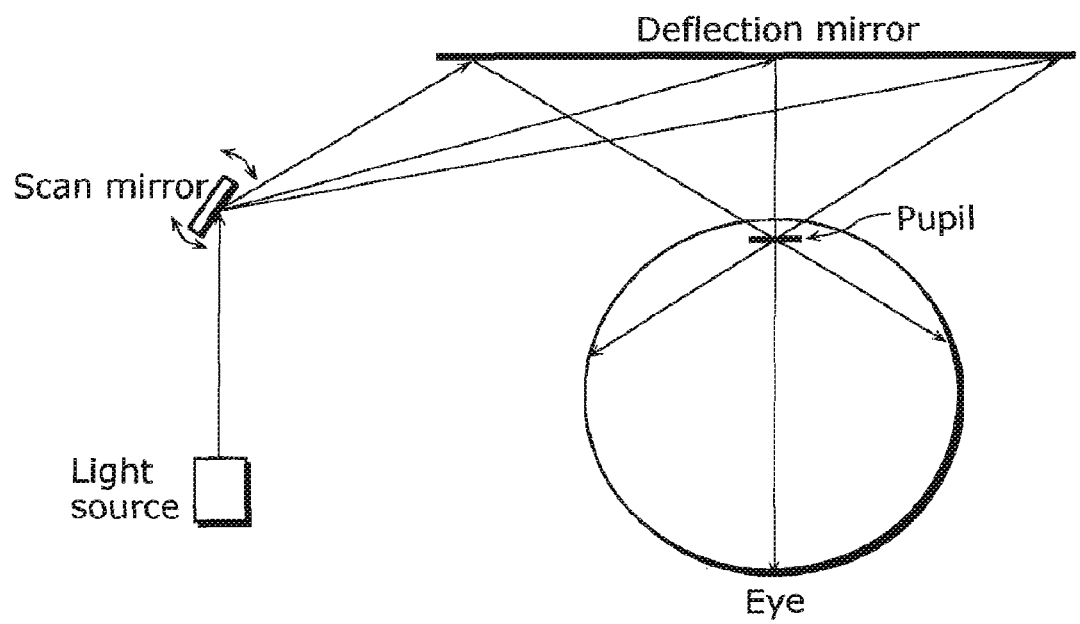
FIG. 23 illustrates a state in which an eye of a user of a conventional display apparatus faces the front.

As shown in FIG. 4, the deflection unit 104 of the present invention is different from the conventional deflection mirror shown in FIG. 23 in that it has deflection characteristics of deflecting the beam scanned by the scan unit 103 such that at least a portion of the scanned beam passes through the user's pupil at a position other than the center of the user's pupil. More specifically, it has deflection characteristics of deflecting the beam such that the beam enters the user's pupil at different positions depending on the incidence angle at which the beam enters the user's pupil.

With the conventional system shown in FIG. 23, the beams entering the user's pupil at an angle from the left, front, or right are deflected by the deflection mirror such that they all pass through the user's pupil at the pupil center.

In contrast, in FIG. 4 of the present invention, the deflection unit 104 deflects beams such that: the beam entering the user's pupil at an angle from the left passes through the pupil at a position on the left of the pupil center; the beam entering the user's pupil from the front passes through the pupil at the pupil center; and the beam entering the user's pupil at an angle from the right passes through the pupil at a position on the right of the pupil center.

Figure 24:
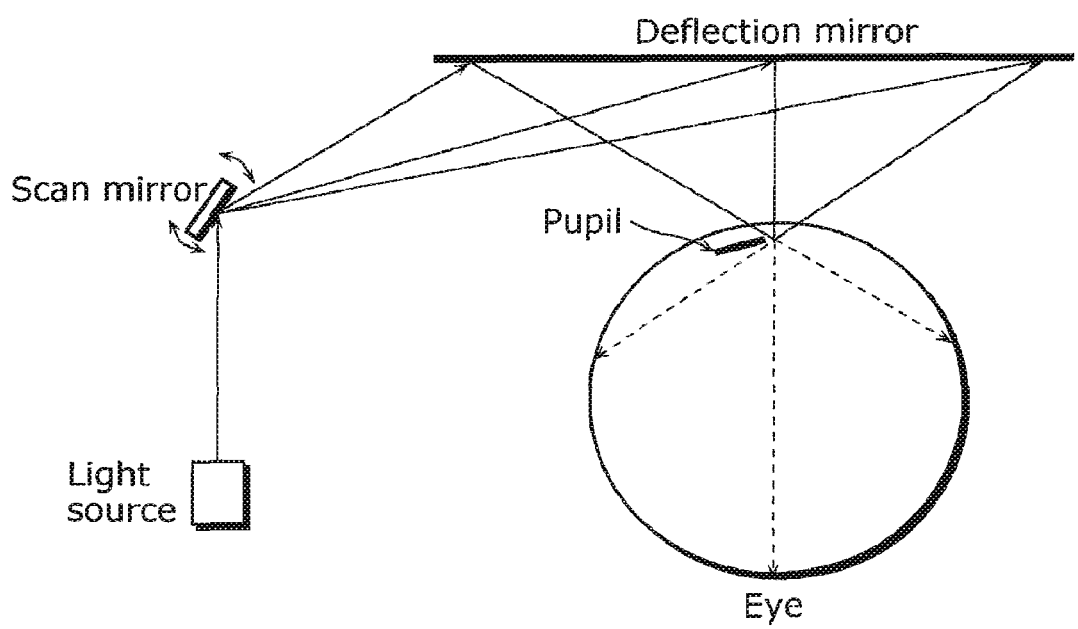
FIG. 24 illustrates a state in which an eye of a user of a conventional display apparatus faces to the left.

As a result, when the user moves the pupil to the left by turning the eyeball to the left so as to view the left side of the screen, the conventional system causes the state of FIG. 23 to be the state of FIG. 24, resulting in a pupil misalignment because no beams can pass through the user's pupil. With the present invention, however, the state of FIG. 4 becomes the state of FIG. 5, allowing the user to view the left side of the screen because the beam entering at an angle from the left can pass through the user's pupil. Likewise, the user can continuously view the right side of the screen even when the pupil is moved to the right for viewing the right side of the screen.

In addition, even with the vertical direction as with the horizontal direction, deflecting beams such that the beams pass through the user's pupil at different positions as shown in FIG. 4 allows the user to continuously view the upper side of the screen even when the pupil is moved upward for viewing the upper side of the screen, and to continuously view the lower side of the screen even when the pupil is moved downward for viewing the lower side of the screen.

With assumptions that the diameter of the user's pupil is 3 millimeters, the distance between the user's pupil and the deflection unit 104 is 15 millimeters, and the distance between the user's pupil and the center of eyeball rotation is 10.5 millimeters, a trial calculation of the screen's view angle that allows the continuous viewing shows the following: A pupil misalignment occurs when the user's line of sight moves approximately 14 degrees or more from the center of the screen in the case of the conventional example shown in FIG. 23, whereas in the case of FIG. 4 of the present invention, the user can continuously view the object at the end of the user's line of sight, as long as the movement of the user's line of sight is within approximately 26 degrees from the center of the screen.

It is to be noted that the deflection unit 104 may allow the beam to enter the user's pupil at different positions depending on the incidence angle at which the beam enters the pupil as described above, or the deflection unit 104 may use a combination of various deflection methods. For example, the left-eye deflection unit may be given deflection characteristics different from that of the right-eye deflection unit. This allows a pupil misalignment in one eye to be compensated for by the other eye. In addition, the deflection unit may be given deflection characteristics that make the horizontal incidence angle at which the beam enters the pupil different from its vertical incidence angle. This leads to an advantageous effect of making the condition for the pupil misalignment occurrence different between the horizontal angle of view and the vertical angle of view. In addition, the deflection unit may be given different deflection characteristics depending on the beams scanned by plural scan units. This allows a pupil misalignment with a beam scanned by one scan unit to be compensated for by a beam scanned by another scan unit.

With reference to FIGS. 6A to 6G, variations of the deflection characteristics given to the deflection unit 104 shall be described. FIG. 6A illustrates deflection characteristics 801 described with reference to FIGS. 4 and 5, and FIGS. 6B to 6G illustrate other deflection characteristics 802 to 806R. It is to be noted that FIGS. 6A to 6G assume the following: a straight line which extends through the pupil center and is perpendicular to the deflection unit 104 is a virtual line I; an area of the deflection unit 104 which is on the left of the virtual line I is a left deflection area 104L; and an area of the deflection unit 104 which is on the right of the virtual line I is a right deflection area 104R. Further, the incidence angle of a beam is assumed to indicate an angle between the beam and the virtual line I.

With the deflection characteristics 801 illustrated in FIG. 6A, the beam scanned on the left deflection area 104L by the scan unit 103 passes through an area on the left of the pupil center; the beam scanned on the right deflection area 104R passes through an area on the right of the pupil center; and the beam scanned on the virtual line I passes through the pupil center. Moreover, with the deflection characteristics 801, all the deflected beams are focused at a position deeper than the pupil center (closer to the center of the eyeball). In other words, the deflection focal point is formed at a position deeper than the pupil. As a result, the user can continuously view the left side of the screen when the eyeball rotates to the left, and in addition, the right side of the screen can gradually disappear from the right edge of the screen. Furthermore, there is no need for a significant modification to the conventional method for manufacturing the deflection unit 104.

Furthermore, the deflection characteristics 801 illustrated in FIG. 6A may be applied not only to the horizontal direction, but also to the vertical direction. To be more specific, beams may be deflected such that the beam scanned on an upper deflection area, which is above the virtual line extending through the pupil center and perpendicular to the deflection unit 104, passes through the user's pupil on an area above the pupil center, and the beam scanned on a lower deflection area, which is below the virtual line, passes through the user's pupil on an area below the pupil center.

In addition, as a variation of the deflection characteristics 801 illustrated in FIG. 6A, the horizontal distance between the user's pupil and the deflection focal point may be different from the vertical distance between the user's pupil and the deflection focal point. Making the vertical distance longer than the horizontal distance allows the vertical eyeball rotation causing a pupil misalignment, to be larger, thereby allowing widening of the upper and lower angles of view that do not cause a pupil misalignment. This method is effective because, although the horizontal angle of view can be virtually widened through the left and right eyes complementing each other, the left and right eyes cannot complement each other for the vertical angle of view.

In the above description, the deflection characteristics are defined for the horizontal and vertical directions separately; however they are not limited to this, and may be defined two-dimensionally. In this case, the screen displayed to the user shall be described with the terms "screen center area", "screen midway area", and "screen edge area" in ascending order of distance from the screen center. When the user's line of sight is at the screen center area, the incidence angle at which the beam enters the user's pupil is smallest on the screen center area and largest on the screen edge area. Meanwhile, the user's pupil shall be described with the terms "pupil center area" indicating a predetermined area of the pupil including the pupil center, and "pupil edge area" indicating an area around the pupil center area.

The deflection characteristics 801 illustrated in FIG. 6A are for deflecting the beams for the screen center area toward the pupil center, deflecting the beams for the screen midway area toward the pupil center area (except for the pupil center), and deflecting the beams for the screen edge area toward the pupil edge area. Similarly, the deflection characteristics 802 illustrated in FIG. 6B are for deflecting the beams for the screen edge area toward the pupil edge area, and deflecting the beams for the screen center area and the screen midway area toward the pupil center area (the pupil center). With this, when the user's eyeball rotates to the left, there is an advantageous effect of increasing the eyeball rotation angle that allows the user to continuously view the right-side screen midway area, as well as allowing the user to continuously view the left side of the screen.

The deflection characteristics 803 illustrated in FIG. 6C are for deflecting the beams for the screen edge area and the screen midway area toward the pupil edge area, and deflecting the beams for the screen center area toward the pupil center area (the pupil center). With this, there is an advantageous effect of allowing the user to continuously view the left side of the screen when the user's eyeball rotates to the left. Furthermore, there is also an advantageous effect of increasing the eyeball rotation angle that allows continuous viewing of the left-side screen midway area even when the user's eyeball rotates further to the left.

The deflection characteristics 804 illustrated in FIG. 6D are a modified version of the deflection characteristics 803 of FIG. 6C, and are for deflecting also the beams for the screen center area toward the pupil edge area. With this, there is an advantageous effect of allowing the user to continuously view the left side of the screen when the user's eyeball rotates to the left. Furthermore, there is also an advantageous effect of increasing the eyeball rotation angle that allows continuous viewing of the screen center area even when the user's eyeball rotates further to the left.

The deflection characteristics 805 illustrated in FIG. 6E are a modified version of the deflection characteristics 801 of FIG. 6A, and are for deflecting the beams for the screen edge area such that the beams pass through an area outside the pupil when the user's line of sight is at the screen center area. With this, when the user's eyeball rotates to the left, there is an advantageous effect of allowing the user to start seeing the left-side screen edge area, as well as allowing the user to continuously view the left-side screen midway area. Moreover, the eyeball rotation angle that allows the user to continuously view the screen edge area can be increased when the user's eyeball rotates further to the left.

Further, the deflection characteristics 806L and 806R illustrated in FIGS. 6F and 6G are for deflecting beams such that the beams scanned on the left deflection area 104L and the beams scanned on the right deflection area 104R are bilaterally asymmetrical with respect to the virtual line I in incidence angle at which the beams enter the user's pupil, and distance between the pupil center and the incidence positions at which the beams enter the user's pupil.

To be more specific, the deflection characteristics 806L illustrated in FIG. 6F are for deflecting the beams for the left side of the screen in the same manner as the deflection characteristics 801 illustrated in FIG. 6A, and deflecting the beams for the right side of the screen in the conventional manner shown in FIG. 23. That is to say, the beams are deflected such that the incidence angles at which the beams scanned on the left deflection area 104L enter the user's pupil are smaller than that of the beams scanned on the right deflection area 104R, and that the distances between the pupil center and the incidence positions at which the beams scanned on the left deflection area 104L enter the user's pupil are longer than that of the beams scanned on the right deflection area 104R.

Similarly, the deflection characteristics 806R illustrated in FIG. 6E are for deflecting the beams for the right side of the screen in the same manner as the deflection characteristics 801 illustrated in FIG. 6A, and deflecting the beams for the left side of the screen in the conventional manner shown in FIG. 23. That is to say, the beams are deflected such that the incidence angles at which the beams scanned on the right deflection area 104R enter the user's pupil are smaller than that of the beams scanned on the left deflection area 104L, and that the distances between the pupil center and the incidence positions at which the beams scanned on the right deflection area 104R enter the user's pupil are longer than that of the beams scanned on the left deflection area 104L.

For example, providing the left-eye deflection unit 104 with the deflection characteristics 806L and the right-eye deflection unit 107 with the deflection characteristics 806R allows the user to continuously view the left side of the screen with the left eye when the eyeballs are rotated to the left. In addition, the user can continuously view the right side of the screen with the right eye when the eyeballs are rotated to the right.

Figure 25:
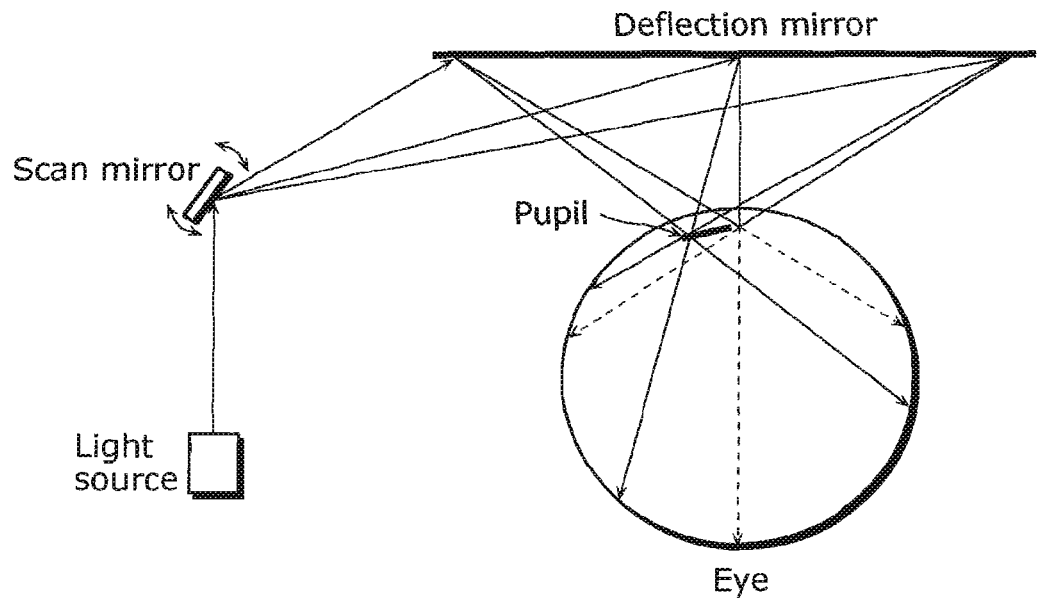
FIG. 25 illustrates a conventional display apparatus having a deflection mirror with plural focal points.
Figure 26:
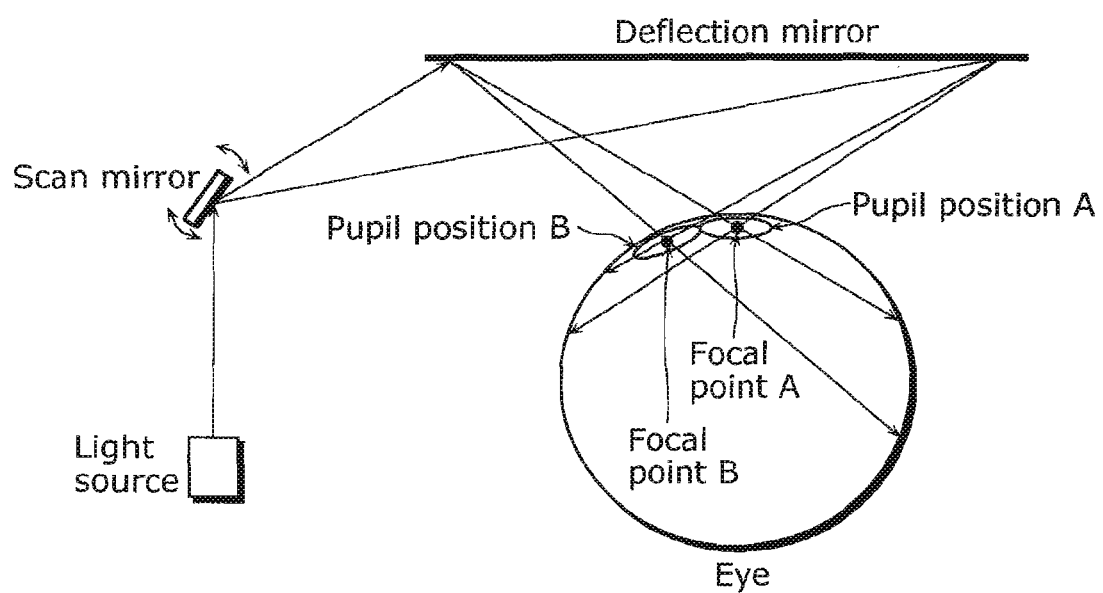
FIG. 26 illustrates states before and after a change in a pupil position, in relation to a conventional display apparatus.
Figure 27:
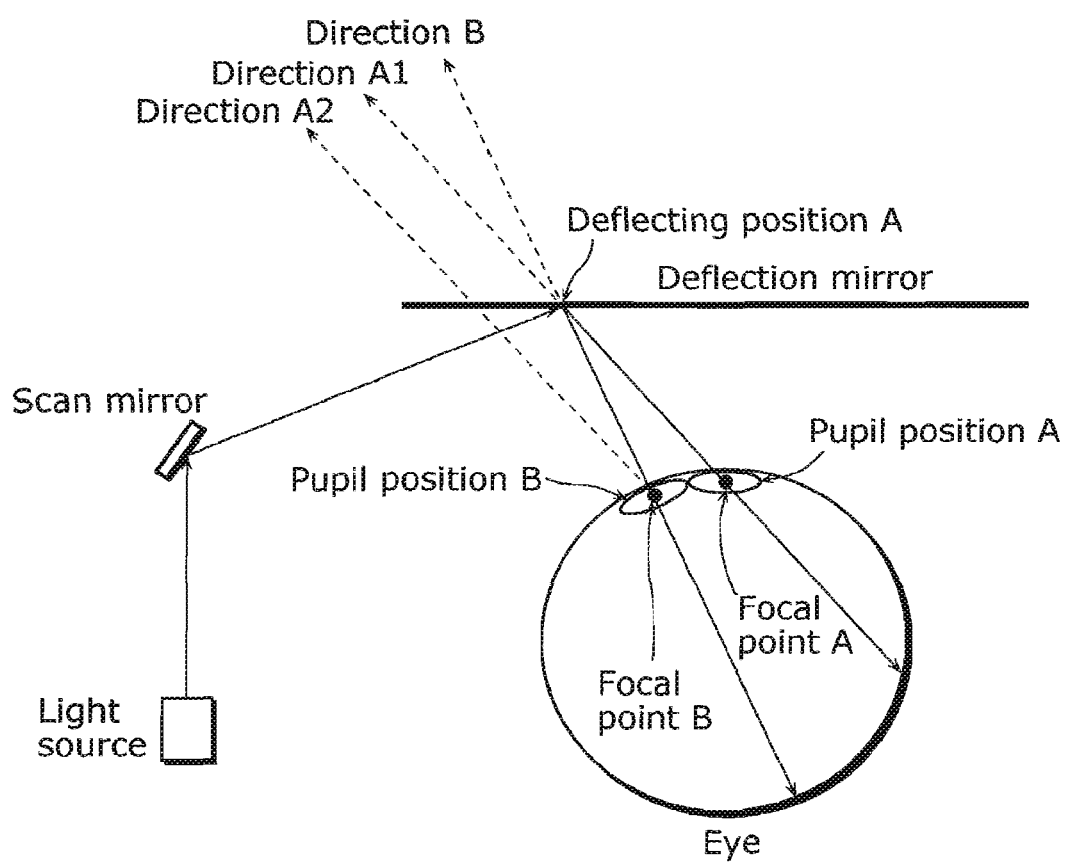
FIG. 27 illustrates directions in which an image can be viewed, in relation to a conventional display apparatus.

It is to be noted that the method of the present invention as shown in FIG. 4 may be combined with the conventional method of providing plural deflection focal points as shown in FIG. 25. Further, the deflection units 104 and 107 and scan units 103 and 108 may be moved or rotated so as to deflect the beams in such a manner that the beams pass through the user's pupil at different positions depending on the incident angles of the beams entering the user's pupil.

It is to be noted that although Embodiment 1 illustrates drawing images by two-dimensionally scanning beams, the deflection units 104 and 107 may deflect beams so that display light from a two-dimensional image display device such as a liquid crystal is focused near the user's pupils (Maxwellian view).

Each of the units and parts shown in FIGS. 1A to 2 may be contained in a single or plural cases. For example, the light sources 101 and 110 may be contained in a case separately from the scan units 103 and 108. Further, the headphone units 106 and 112 do not need to be included. In addition, the units may be dispersedly provided. For example, the control units 105 and 111 may be partially included in the light sources 101 and 110 or in the scan units 103 and 108. Furthermore, each of the units may be plural. For example, there may be two scan units for each of the left and right eyes. In addition, each unit may be shared by plural apparatuses. For example, the light source 101 may be shared by two display apparatuses.

With the above structure of the display apparatus according to the present invention, the deflection units 104 and 107 deflect beams such that the beams pass through the user's pupils at different positions depending on the incidence angles at which the beams enter the pupils, thereby producing an advantageous effect of allowing beam-scan display apparatuses such as HMDs to reduce the problem of the pupil misalignment without having plural deflection focal points.

Since there is no need to provide plural deflection focal points, it is also possible to prevent problems involved with plural deflection focal points, such as: doubly drawing images on the user's retinas; lower efficiency for beam utilization; the need of a high-power light source; higher power consumption; complication of the method for manufacturing the deflection units 104 and 107; deterioration of the characteristics of the deflection units 104 and 107; and complication of the display apparatus as a whole.

Embodiment 2

Figure 7:
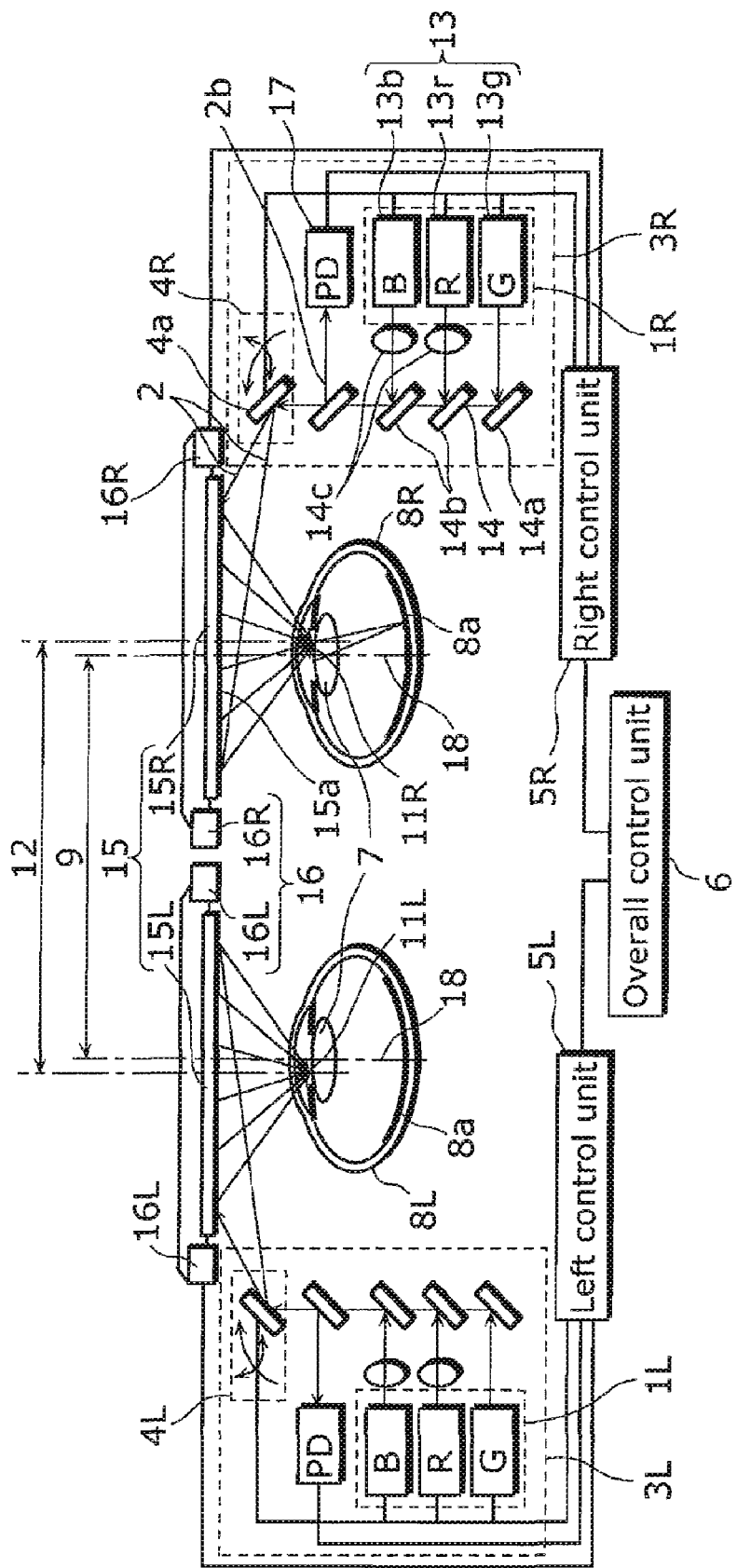
FIG. 7 is a schematic structural diagram of a display apparatus according to Embodiment 2.

With reference to FIG. 7, a display apparatus 10 according to Embodiment 2 of the present invention shall be described. FIG. 7 is a schematic structural diagram of the display apparatus 10.

The display apparatus 10 in Embodiment 2 includes: image output units 3R and 3L which output emitted beams 2; a deflection unit 15 which deflects the emitted beams 2 toward the user's eyes 8R and 8L (beam focusing positions 11R and 11L); control units 5R and 5L which control the image output units 3R and 3L; and an overall control unit 6 which performs overall control over the processing of the control units 5R and 5L. It is to be noted that the image output units 3R and 3L respectively include light sources 1R and 1L, scan units 4R and 4L which two-dimensionally scan the emitted beams 2 emitted from the light sources 1R and 1L, and a light detection unit 17. Further, the deflection unit 15 includes hologram mirrors 15R and 15L provided at positions facing the right and left eyes 8R and 8L, respectively. As clear from the above structure, the display apparatus 10 in Embodiment 2 has bilaterally symmetrical optical systems and guides the emitted beams 2 emitted from the light sources 1R and 1L, to the beam focusing positions 11R and 11L of the user's right and left eyes 8R and 8L.

Next, operations of the bilaterally symmetrical display apparatus 10, mainly the operations of the optical systems, shall be described in detail. Described here as an example are the operations of the right one of the bilaterally symmetrical optical systems.

As shown in FIG. 7, the light source 1R includes an RGB light source 13 composed of, at least, a blue laser light source (hereinafter referred to as "B light source") 13b, a red laser light source (hereinafter referred to as "R light source") 13r, a green laser light source (hereinafter referred to as "G light source") 13g. Images to be projected on retinas 8a are outputted through intensity modulation, according to the magnitude of the input current, of the beams emitted in time series using the RGB light source 13. Such a structure allows the display apparatus 10 to be high in color reproducibility, small in size, and low in power consumption.

The lasers used here as the B light source 13b and R light source 13r are semiconductor lasers which emit laser beams having wavelengths of 450 nm and 650 nm, whereas the laser used here as the G light source 13g is an SHG laser which is obtained by exciting a semiconductor laser and emits a laser beam having a wavelength of 530 nm. Laser beams 14 emitted from the B light source 13b and R light source 13r are converted into parallel beams by a lens 14c, which are then emitted from the light source 1R. From the G light source 13g, parallel beams are emitted.

The scan unit 4R includes a movable mirror 4a to two-dimensionally scan, toward the hologram mirror 15R, the laser beams 14 emitted from the light source 1R.

The hologram mirror 15R deflects, toward one of the user's eyes (the beam focusing position 11R), the laser beams 14 scanned by the scan unit 4R. It is to be noted that the display apparatus 10 includes a deflection unit position adjustment unit 16 which moves the deflection unit 15 in a direction (horizontal direction of FIG. 7) intersecting the direction of the user's line of sight (vertical direction of FIG. 7). The deflection unit position adjustment unit 16 includes driving units 16L and 16R which drive the left and right hologram mirrors 15L and 15R, respectively, independently of each other.

The laser beams 14 emitted from the light source 1R are integrated into a single laser beam by a reflecting mirror 14a and dichroic mirrors 14b so as to be incident on the movable mirror 4a of the scan unit 4R. Subsequently, the movable mirror 4a scans the laser beam 14 on a reflecting surface 15a of the hologram mirror 15R as the emitted beams 2.

The emitted beams 2 are reflected off the reflecting surface 15a of the hologram mirror 15R to enter a pupil 7 of the right eye 8R and project an image on the retina 8a. It is to be noted that the movable mirror 4a is rotatable not only in the horizontal direction, but also in the vertical direction because the emitted beams 2 are two-dimensionally scanned on the reflecting surface 15a of the hologram mirror 15R. The operations of the left optical system of the display apparatus 10 are performed using the left hologram mirror 15L as in the above manner.

Here, the distance between center lines 18 of the pupils 7 of the right and left eyes 8R and 8L is defined as a pupil-to-pupil distance 9. In addition, the distance between the beam focusing position 11R at which the emitted beams 2 reflected from the reflecting surface 15a of the hologram mirror 15R are focused, and the beam focusing position 11L at which the emitted beams 2 reflected from the reflecting surface 15a of the hologram mirror 15L are focused, is defined as a focus-to-focus distance 12.

In the display apparatus 10 having the above structure, the hologram mirrors 15R and 15L are positioned in such a positional relationship that the user's pupil-to-pupil distance 9 and the focus-to-focus distance 12 are different from each other. That is to say, the beam focusing positions 11L and 11R, at which the emitted beams 2 entering the left and right pupils 7 are focused, are shifted from the center lines 18 of the respective pupils 7 in a bilaterally symmetrical manner.

With such a structure, when the rotations of the eyes 8R and 8L cause the pupils 7 to move, the emitted beams 2 entering one of the right and left eyes 8R and 8L are partially shielded by a corresponding iris 8b, but the emitted beams 2 entering the other eye are not shielded by the other iris 8b. In such a manner, images can be viewed by at least one of the eyes 8R and 8L, thereby making it possible to provide the display apparatus 10 with which missing of the image output and so on is less likely to occur.

Figures 8A, 8B, 9A, 9B:
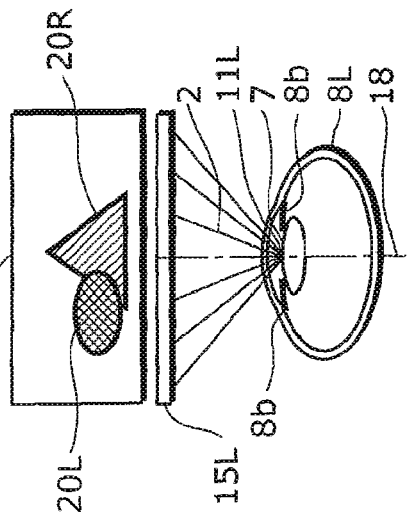
FIG. 8A illustrates a state in which an eye of a user of a display apparatus according to Embodiment 2 faces the front.
FIG. 8B illustrates a state in which an eye of a user of a conventional display apparatus faces the front.
FIG. 9A illustrates a state in which an eye of a user of a display apparatus according to Embodiment 2 faces to the left.
FIG. 9B illustrates a state in which an eye of a user of a conventional display apparatus faces to the left.

FIGS. 8A and 9A are magnified views of main parts of the display apparatus 10 in Embodiment 2, and FIGS. 8B and 9B are magnified views of main parts of a conventional display apparatus, provided for the purpose of comparison with FIGS. 8A and 9A.

FIGS. 8A and 8B are magnified views of main parts of the display apparatus, including the optical system near the left eye 8L. In FIG. 8A, the beam focusing position 11L, at which the emitted beams 2 for drawing an image 20 to be projected are focused, is on the left of the center line 18 of the left eye 8L. In contrast, in FIG. 8B, the beam focusing position 11L is on the center line 18 of the left eye 8L, and is at the center even when viewed from the left and right irises 8b.

FIGS. 9A and 9B illustrate an optical positional relationship between the emitted beams 2 and the left eye 8L when the user rotates the left eye 8L to the left without moving the user's face from the states of FIGS. 8A and 9A so as to view the left side of the image 20 from its center.

As illustrated in FIG. 9B, with the conventional display apparatus, the user intending to view an image 20L on the left becomes unable to view an image 20R on the right because the image 20R is shielded by the iris 8b. However, with the display apparatus 10 in Embodiment 2 as illustrated in FIG. 9A, since the beam focusing position 11L is on the left of the center line 18 of the left eye 8L, the image 20R on the right can also be viewed without being shielded by the iris 8b.

Although FIGS. 9A and 9B illustrate the case of the left eye 8L, the same holds true for the case of the right eye 8R. More specifically, with the conventional display apparatus, the user intending to view the left or right side of the image 20 by rotating the eyes 8R and 8L becomes unable to view the other side of the image 20 because the other side is shielded by the iris 8*b*. The left and right sides are shielded by the respective irises 8*b* approximately at the same time.

On the other hand, with the display apparatus 10 illustrated in Embodiment 2, the user intending to view the left or right side of the image 20 by rotating the eyes 8R and 8L can view the other side of the image 20 with at least one of the eyes 8R and 8L. Therefore, when the rotation of the eyes 8R and 8L causes a movement of the pupils 7, the image 20 can be viewed with at least one of the eyes 8R and 8L, thereby making it possible to provide the display apparatus 10 with which missing of the image output and so on does not occur.

The display apparatus 10 in Embodiment 2 having such a structure further includes, as shown in FIG. 7, a light detection unit 17 which detects reflected light 2*b* which is reflected from the respective pupils 7 of the left and right eyes 8R and 8L. Based on a signal from the light detection unit 17, the control units 5 and the overall control unit 6 control at least one of the position of the deflection unit 15 and the intensity of the emitted beams 2 emitted from the image output units 3R and 3L.

Figure 10A:
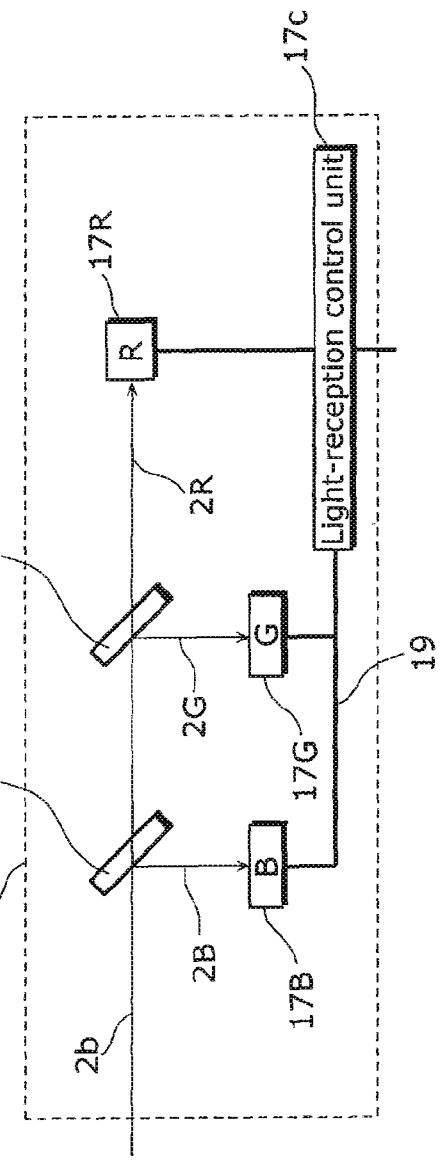
FIG. 10A is a schematic structural diagram of a light detection unit in a display apparatus according to Embodiment 2.
Figure 10B:
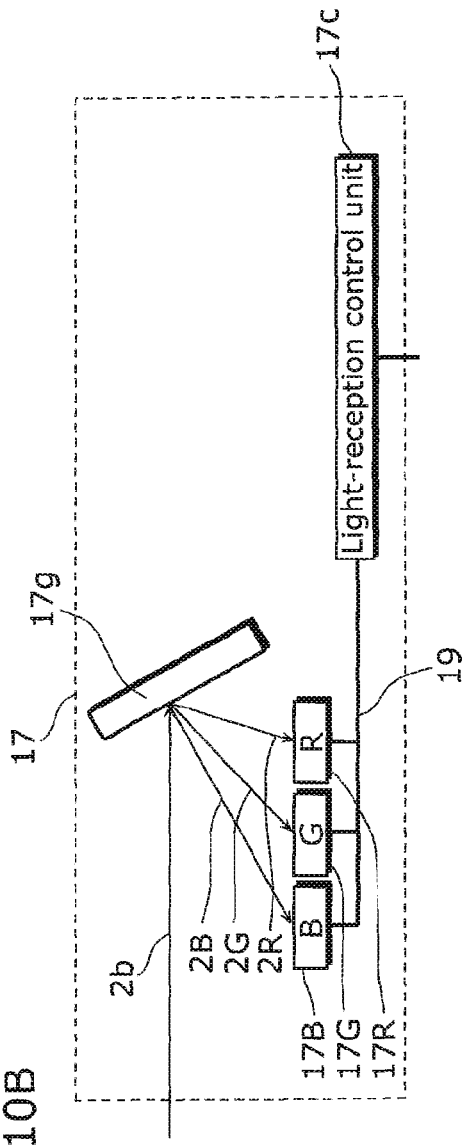
FIG. 10B illustrates another example of a light detection unit in a display apparatus according to Embodiment 2.
Figure 11:
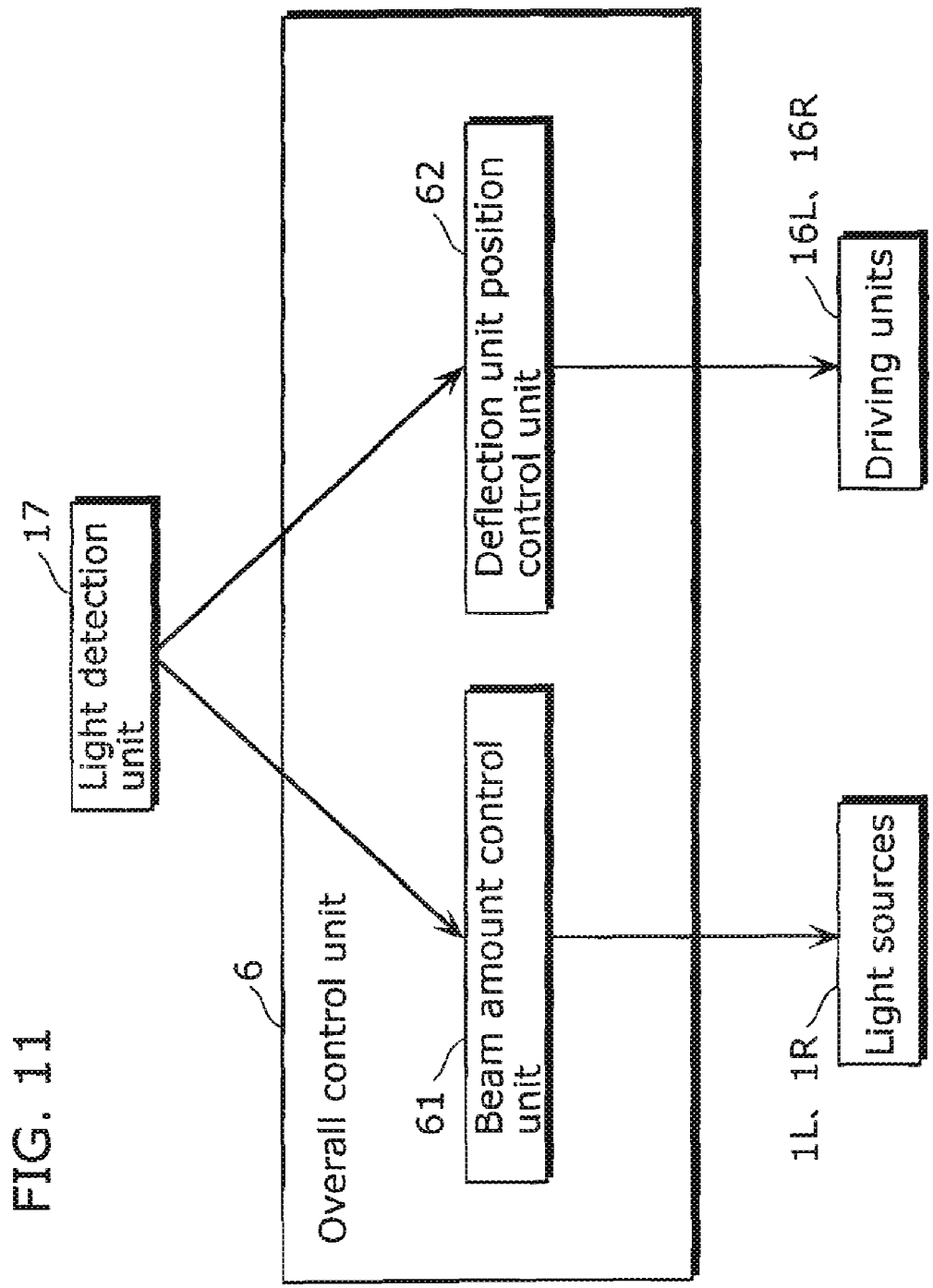
FIG. 11 is a functional block diagram of a display apparatus according to Embodiment 2.

With reference to FIGS. 10A, 10B, and 11, the control units 5L and 5R, overall control unit 6, and light detection unit 17 of the display apparatus 10 according to Embodiment 2 shall be described. FIG. 10A is a schematic structural diagram of the light detection unit 17, FIG. 10B illustrates another structure of the light detection unit 17, and FIG. 11 is a functional block diagram of the display apparatus 10.

The light detection unit 17 according to Embodiment 2 detects light reflected from the user's eyes so as to detect whether the emitted beams 2 have entered the pupil 7, or not have entered the pupil 7 due to the shield of the iris 8*b*. In addition, the light detection unit 17 detects the center of the pupil 7 based on the intensity of the reflected light.

As illustrated in FIG. 10A, the reflected light 2*b* enters the light detection unit 17 and is separated by two dichroic mirrors 17*a* and 17*b* into blue laser light (hereinafter referred to as "B light") 2B, green laser light (hereinafter referred to as "G light") 2G, and red laser light (hereinafter referred to as "R light") 2R, each of which is detected by a corresponding light detection unit 17B, 17G, or 17R. Then, the detected light signals are converted into electric signals which are then transmitted to a light-reception control unit 17*c* via a wire 19 to be transmitted to the control units 5L and 5R and overall control unit 6.

As illustrated in FIG. 10B, the reflected light 2*b* similarly enters the light detection unit 17 and is separated by a diffraction grating 17*g* into blue laser light (hereinafter referred to as "B light") 2B, green laser light (hereinafter referred to as "G light") 2G, and red laser light (hereinafter referred to as "R light") 2R, each of which is detected by the corresponding light detection unit 17B, 17G, or 17R. Then, the detected light signals are converted into electric signals which are then transmitted to the light-reception control unit 17*c* via the wire 19 to be transmitted to the control units 5L and 5R and overall control unit 6.

As described, the detection of the reflected light 2*b* through the separation thereof according to wavelength bands allows detection of the color of the iris 8*b* which differs among individual users, thereby enabling precise detection of whether or not the beams are shielded by the iris 8*b*.

Next, as illustrated in FIG. 11, the overall control unit 6 includes a beam amount control unit 61 which controls the amount of the laser beams 14 emitted from the light sources 1R and 1L, and a deflection unit position control unit 62 which controls the position of the deflection unit 15 using the deflection unit position adjustment unit 16.

The beam amount control unit 61 determines, based on the detection by the light detection unit 17, whether the beams deflected by the hologram mirrors 15R and 15L have both entered the user's eyes 8R and 8L, or the beams deflected by one of the hologram mirrors 15R and 15L have not entered the user's eyes 8R and 8L. Then, when determining that the beams deflected by one of the hologram mirrors 15R and 15L have not entered the user's eyes 8R and 8L, the beam amount control unit 61 causes the light source 1R or 1L to increase the amount of the beams to be deflected by the other one of the hologram mirrors 15R and 15L.

In such a structure, the intensity of the reflected light 2*b* is low when the emitted beams 2 pass through the pupils 7 and reach the retinas 8*a*, whereas the intensity of the reflected light 2*b* is high when the emitted beams 2 are reflected from the irises 8*b*. Therefore, it is possible to allow the user to view images with appropriate brightness by controlling the increase/decrease of the amount of the emitted beams 2 by using the left and right control units 5L and 5R and overall control unit 6, based on information indicating determination, which is made based on the intensity of the reflected light, as to which of the eyes 8R and 8L is used for the viewing, or whether both eyes 8R and 8L are used for the viewing.

That is to say, the amount of beams emitted from the light sources 1R and 1L is decreased when both eyes are used for the viewing, whereas the beam amount is increased when only one of the eyes is used for the viewing, so that the fluctuations of the beam amount which occur when the pupils 7 move are suppressed, and thus more easily viewable images 20 can be obtained.

Further, the deflection unit position control unit 62 calculates the user's pupil-to-pupil distance 9 based on the detection by the light detection unit 17. Then, in order to make the focus-to-focus distance 12 different from the pupil-to-pupil distance 9 calculated, the deflection unit position control unit 62 controls the deflection unit position adjustment unit 16 so that the deflection unit position adjustment unit 16 moves each of the hologram mirrors 15L and 15R.

With such a structure, even when a user having a different pupil-to-pupil distance 9 uses the same display apparatus 10 of Embodiment 2, it is possible to easily move the hologram mirrors 15L and 15R to the positions facing the user's eyes 8L and 8R, respectively, by using the deflection unit position adjustment unit 16. Accordingly, the focus-to-focus distance 12 can be appropriately set for each individual user, thereby allowing each user to view images without missing of image output, and so on.

Although FIG. 11 has illustrated an example in which the beam amount control unit 61 and deflection unit position control unit 62 are included in the overall control unit 6, the structure is not limited to this. For example, they may be included in one of the control units 5R and 5L, or the processing may be shared among the control units 5R and 5L and the overall control unit 6.

Further, the driving units 16L and 16R constituting the deflection unit position adjustment unit 16 may be, for example, actuators which are controlled by the control units 5L and 5R and the overall control unit 6. Furthermore, they may have such a structure that allows the left and right hologram mirrors 15L and 15R to be manually moved along a rail provided on a frame.

In addition, although Embodiment 2 has illustrated an example in which the beam focusing positions 11L and 11R of the left and right eyes 8L and 8R are shifted along the horizontal direction of the center line 18, the beam focusing positions 11L and 11R do not need to be on a horizontal line connecting the left and right pupils. At least one of them may be off the horizontal line. To be more specific, at least one of them may be above or below, or diagonal to the corresponding pupil. However, they are preferably at positions shifted from the respective left and right pupils in a bilaterally symmetrical manner. In that case, it is possible to prevent the screen from disappearing when the user rotates the eyes in the vertical direction.

Embodiment 3

Figure 12:
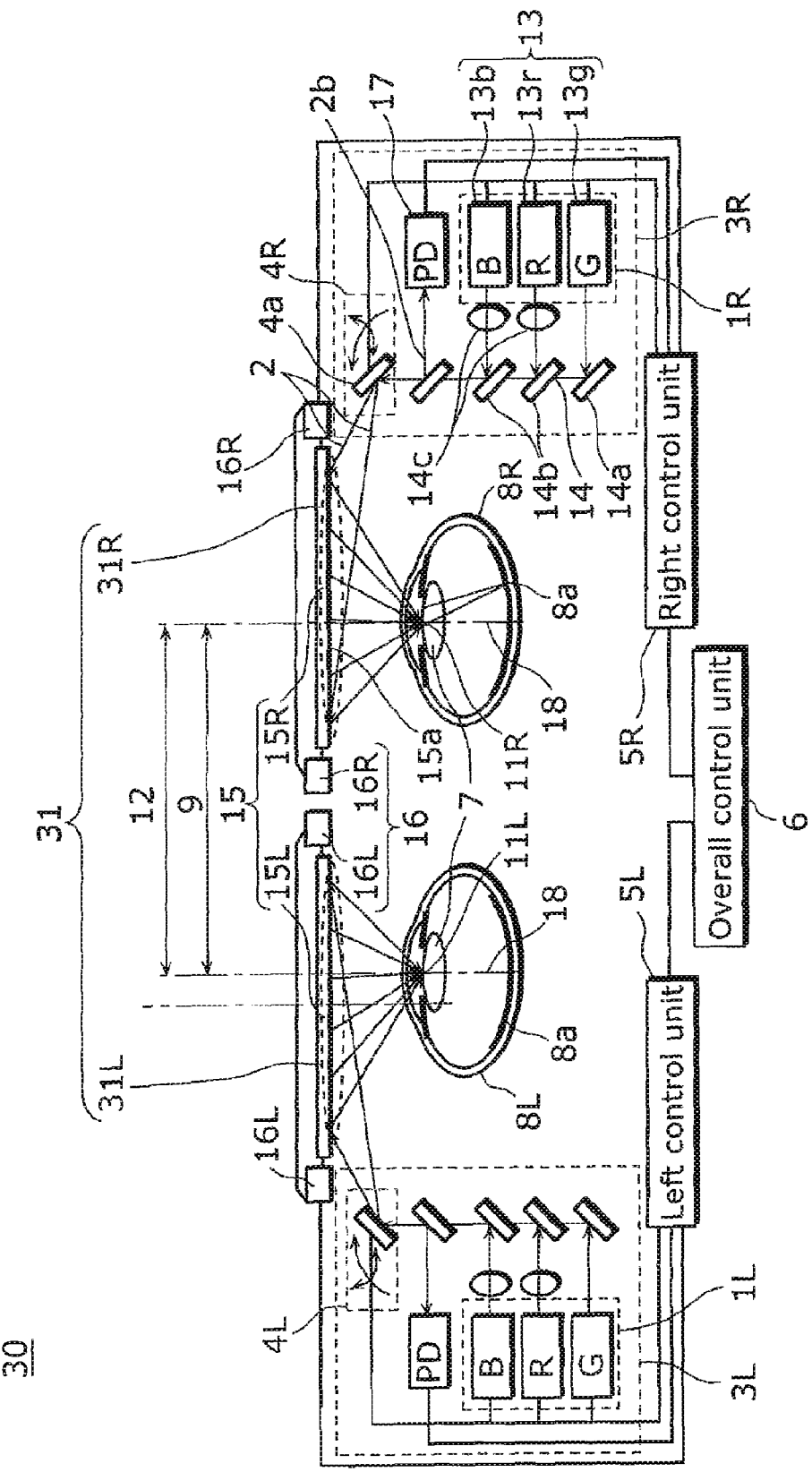
FIG. 12 is a schematic structural diagram of a display apparatus according to Embodiment 3.

With reference to FIG. 12, a display apparatus 30 according to Embodiment 3 of the present invention shall be described. FIG. 12 is a schematic structural diagram of the display apparatus 30. It is to be noted that the basic structure of the display apparatus 30 is common to that of the display apparatus 10 illustrated in FIG. 7. Thus, a detailed description of the common aspects shall be omitted, and the following description centers on different aspects.

With the display apparatus 30 according to Embodiment 3, the hologram mirrors 15L and 15R project, onto the user's eyes 8L and 8R, respectively, images with different visual fields 31. It is to be noted that elliptical areas surrounded by broken lines in FIG. 12 represent the visual fields 31, one being a left visual field 31L and another being a right visual field 31R. Here, the pupil-to-pupil distance 9 is equal to the focus-to-focus distance 12, which is a distance between the beam focusing positions 11L and 11R.

Such a structure allows the user to view images with at least one of the eyes 8R and 8L when a rotation of the eyes 8R and 8L causes a movement of the pupils 7. This, as a result, makes it possible to provide the display apparatus 30 with which missing of the image output and so on does not occur, thereby allowing the user to view the whole images outputted by the image output unit 3.

Figure 13:
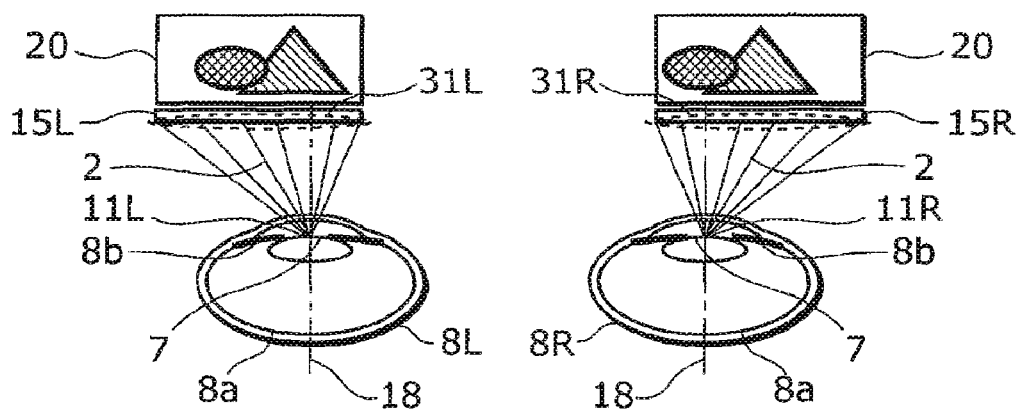
FIG. 13 illustrates a state in which the eyes of a user of a display apparatus according to Embodiment 3 of the present invention face the front.

FIG. 13 is a magnified view of main parts of the display apparatus 30 in Embodiment 3. More specifically, FIG. 13 is a magnified view of main parts of the display apparatus 30, including the optical systems near the user's eyes 8R and 8L. In FIG. 13, the beam focusing positions 11L and 11R, at which the emitted beams 2 for drawing an image 20 to be projected are focused, are on the corresponding center lines 18 of the eyes 8L and 8R. However, the left and right visual fields 31L and 31R of the respective left and right eyes 8L and 8R are different from each other in visual fields on the left and right of the corresponding center line 18. The emitted beams 2 deflected by the hologram mirrors 15L and 15R are focused on the pupils 7 such that the left eye 8L has a wider visual field on the left of the corresponding center line 18 and the right eye 8R has a wider visual field on the right of the corresponding center line 18.

In order to display images with different visual fields to the user's left and right eyes 8L and 8R, the hologram mirror 15L according to Embodiment 3 has deflection characteristics of deflecting beams such that the beams scanned on a left deflection area, which is on the left of the center line (virtual line) 18 extending through the pupil center and perpendicular to the hologram mirror 15L, and the beams scanned on a right deflection area, which is on the right of the center line 18, are bilaterally asymmetric with respect to the center line 18, in incident angle of the beams entering the user's pupil. In FIG. 12, the incidence angles of the beams scanned on the left deflection area are larger than the incidence angles of the beams scanned on the right deflection area.

Likewise, the hologram mirror 15R has deflection characteristics of deflecting beams such that the beams scanned on a left deflection area, which is on the left of the center line (virtual line) 18 extending through the pupil center and perpendicular to the hologram mirror 15R, and the beams scanned on a right deflection area, which is on the right of the center line 18, are bilaterally asymmetric with respect to the center line 18 in incident angle of the beams entering the user's pupil. In FIG. 12, the incidence angles of the beams scanned on the right deflection area are larger than the incidence angles of the beams scanned on the left deflection area.

Figure 14:
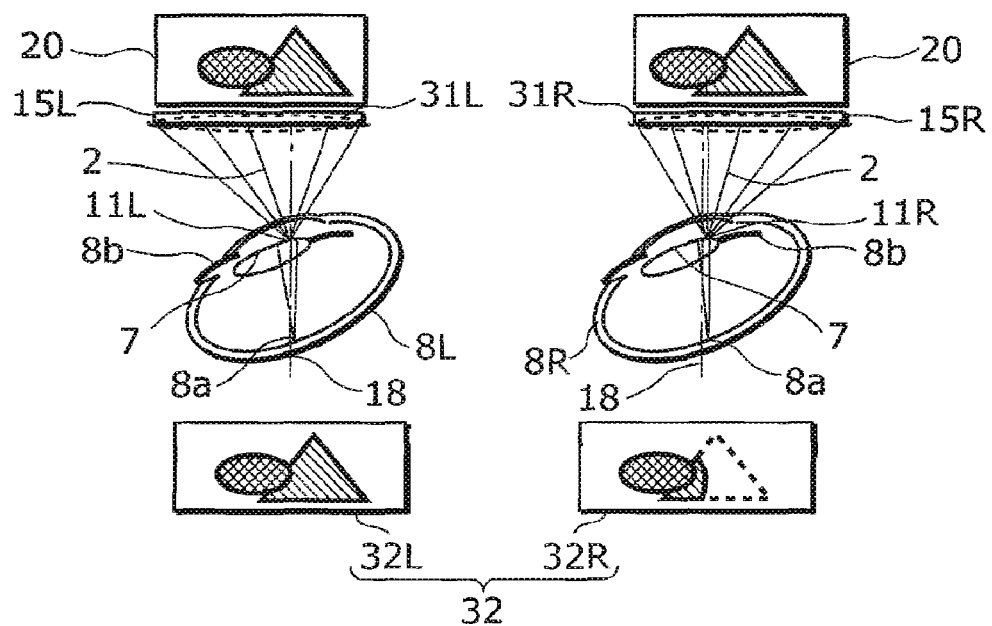
FIG. 14 illustrates a state in which the eyes of a user of a display apparatus according to Embodiment 3 of the present invention face to the left.

FIG. 14 is a magnified view of main parts of the display apparatus 30 in Embodiment 3 when the eyes 8R and 8L are rotated. More specifically, FIG. 14 illustrates an optical positional relationship between the emitted beams 2 and the eyes 8R and 8L when the user rotates the eyes 8R and 8L without moving the user's face from the state of FIG. 13 so as to view the left side of the image 20 from its center. At this time, images 32L and 32R illustrated in FIG. 14 constitute an image 32 projected on the retinas 8a, because visual field areas on the left and right of the center line 18 for the left visual field 31L corresponding to the hologram mirror 15L for the left eye 8L are different from visual field areas on the left and right of the center line 18 for the right visual field 31R corresponding to the hologram mirror 15R for the right eye 8R. Here, for the right eye 8R, a part of the image 32 is missing as shown in the image 32R, because it is shielded by the iris 8b. For the left eye 8L, however, the whole image 20 is clearly projected on the retina 8a as shown in the image 32L, because the visual field area on the right of the corresponding center line 18 is compact.

Such a structure allows the user to view images with at least one of the eyes 8R and 8L when a rotation of the eyes 8R and 8L causes a movement of the pupils 7. This, as a result, makes it possible to provide the display apparatus 30 with which missing of the image output and so on does not occur, thereby allowing the user to view the whole image 20 outputted by the image output unit 3.

It is to be noted that the focus-to-focus distance 12 may be different from the user's pupil-to-pupil distance 9 as in Embodiment 2. Such a structure allows the user to view images with at least one of the eyes 8R and 8L even when a rotation of the eyes 8R and 8L causes a larger movement of the pupils 7, thereby making it possible to provide the display apparatus 30 with which missing of the image output and so on does not occur.

Furthermore, the deflection unit position adjustment unit 16 may further be included to move the hologram mirrors 15L and 15R to the positions facing the eyes 8L and 8R, respectively. With such a structure, even when a user having a different pupil-to-pupil distance 9 uses the same display apparatus 30 of the present invention, it is possible to easily move the left and right deflection units 15 to the positions facing the user's eyes 8L and 8R, respectively, by using the deflection unit position adjustment unit 16. Accordingly, the focus-to-focus distance 12 can be appropriately set for each individual user, thereby allowing each user to view images without missing of image output, and so on.

In Embodiment 3 as in Embodiment 2, the beam focusing positions 11L and 11R do not need to be on a horizontal line connecting the left and right eyes. At least one of them may be off the horizontal line. To be more specific, at least one of them may be above or below, or diagonal to the corresponding pupil. However, they are preferably at positions shifted from the respective left and right pupils in a bilaterally symmetrical manner.

Embodiment 4

Figure 15:
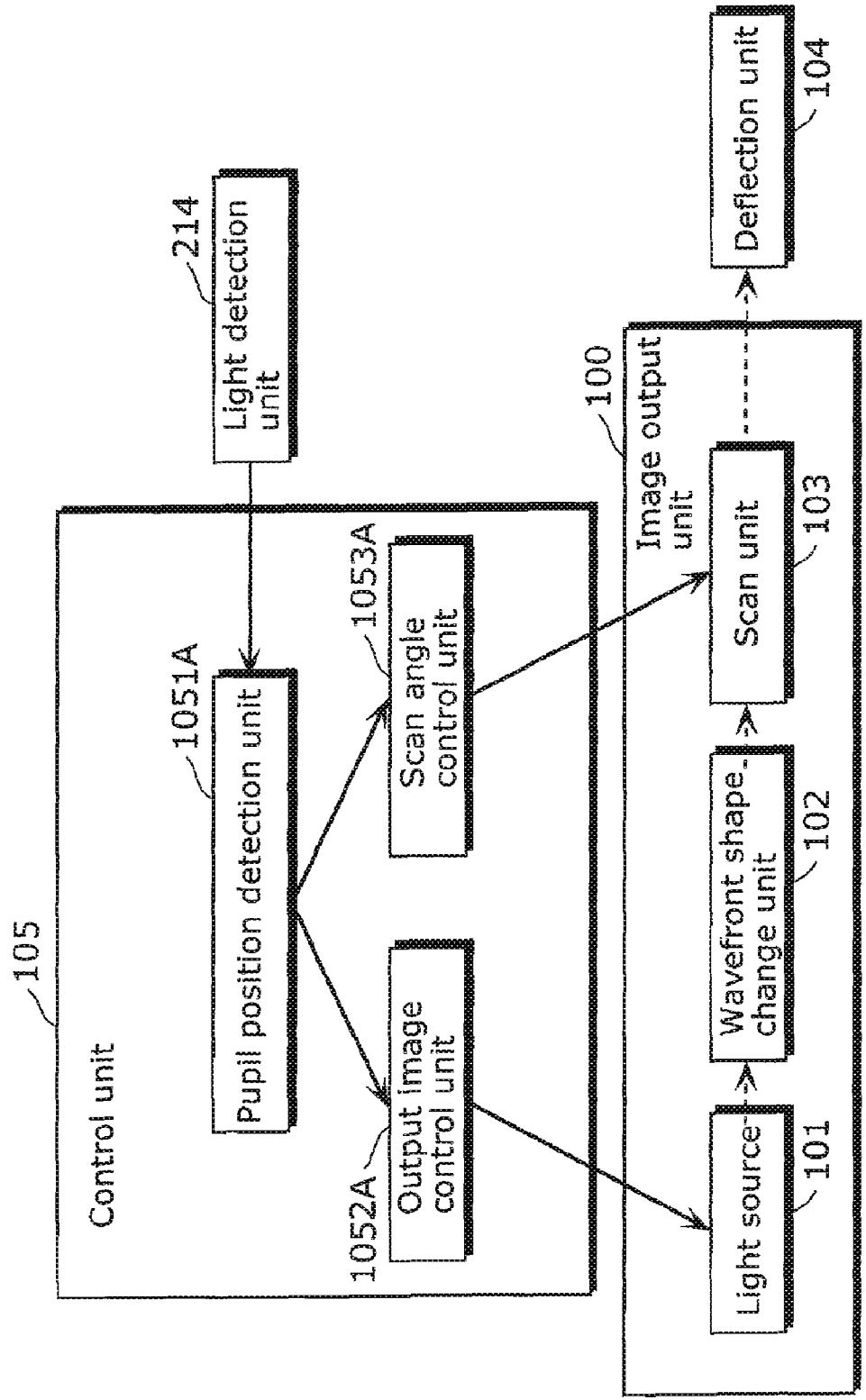
FIG. 15 is a functional block diagram of a display apparatus according to Embodiment 4.

With reference to FIGS. 1A, 1B, 2 and 15, a display apparatus according to Embodiment 4 of the present invention shall be described. FIG. 15 is a functional block diagram of a display apparatus. The structures illustrated in FIGS. 1A, 1B and 2 are common to those in Embodiment 1, and thus a description thereof shall be omitted.

The deflection units 104 and 107 of the display apparatus according to Embodiment 4 have plural focal points as a countermeasure against the pupil misalignment. To be more specific, the deflection units 104 and 107 have deflection characteristics of deflecting beams such that the beams scanned by the scan units 103 and 108 are focused at a first focal point and a second focal point different from the first focal point. That is to say, the deflection units 104 and 107 have functions to divide the beams scanned by the scan units 103 and 108 into beams traveling toward the first focal point and beams traveling toward the second focal point. It is to be noted that the deflection units 104 and 107 having the above structure can be manufactured using a conventional method for manufacturing hologram mirrors. For example, they can be manufactured by devising a combination of an object beam and a reference beam.

The control unit 105 includes an integrated circuit that controls each unit of the HMD. There may be a communication unit which receives video and audio signals through a wireless connection with a peripheral appliance, such as a mobile phone.

The control unit 105 controls the output of the image output unit 100 such that when a rotation of the user's eyeballs causes a change in the pupil position from a position including the first focal point to a position including the second focal point, a virtual image viewed by the user before the change in the pupil position and a virtual image viewed by the user after the change in the pupil position are seen in the same direction. Further, at the same time, the control unit 105 controls the output of the image output unit 100 such that the size of the virtual image viewed by the user before the change in the pupil position equals the size of the virtual image viewed by the user after the change in the pupil position.

It is to be noted that with a display apparatus displaying virtual images at infinity, "virtual images seen in the same direction" means that the beam for drawing pixels before the change in the pupil position and the beam for drawing the same pixels after the change in the pupil position are substantially parallel in areas toward the user's eyes from the deflection units 104 and 107.

More specifically, the control unit 105 includes, as illustrated in FIG. 15, a pupil position detection unit 1051A, an output image control unit 1052A, and a scan angle control unit 1053A.

The pupil position detection unit 1051A detects, based on the detection by the light detection unit 214, a change in the pupil positions, which are the center positions of the user's pupils.

In order that the beam for drawing pixels before a change in the pupil positions and the beam for drawing the same pixels after the change in the pupil positions are substantially parallel in areas toward the user's eyes from the deflection units 104 and 107, the output image control unit 1052A causes the light sources 101 and 110 to output, in a shifted direction along which the user's pupil positions have changed, beams for drawing each pixel. Further, the output image control unit 1052A controls the output of the image output unit 100 such that the sizes of the virtual images viewed by the user are the same before and after the change in the pupil positions.

In order that the beam for drawing pixels before the change in the pupil positions and the beam for drawing the same pixels after the change in the pupil positions are substantially parallel in areas toward the user's eyes from the deflection units 104 and 107, the scan angle control unit 1053A causes the scan units 103 and 108 to scan beams in a shifted direction along which the user's pupil positions have changed.

It is to be noted that although Embodiment 4 illustrates drawing images by two-dimensionally scanning beams, the deflection units 104 and 107 may deflect beams so that display light from a two-dimensional image display device such as a liquid crystal is focused near the user's pupils (Maxwellian view).

Figure 16:
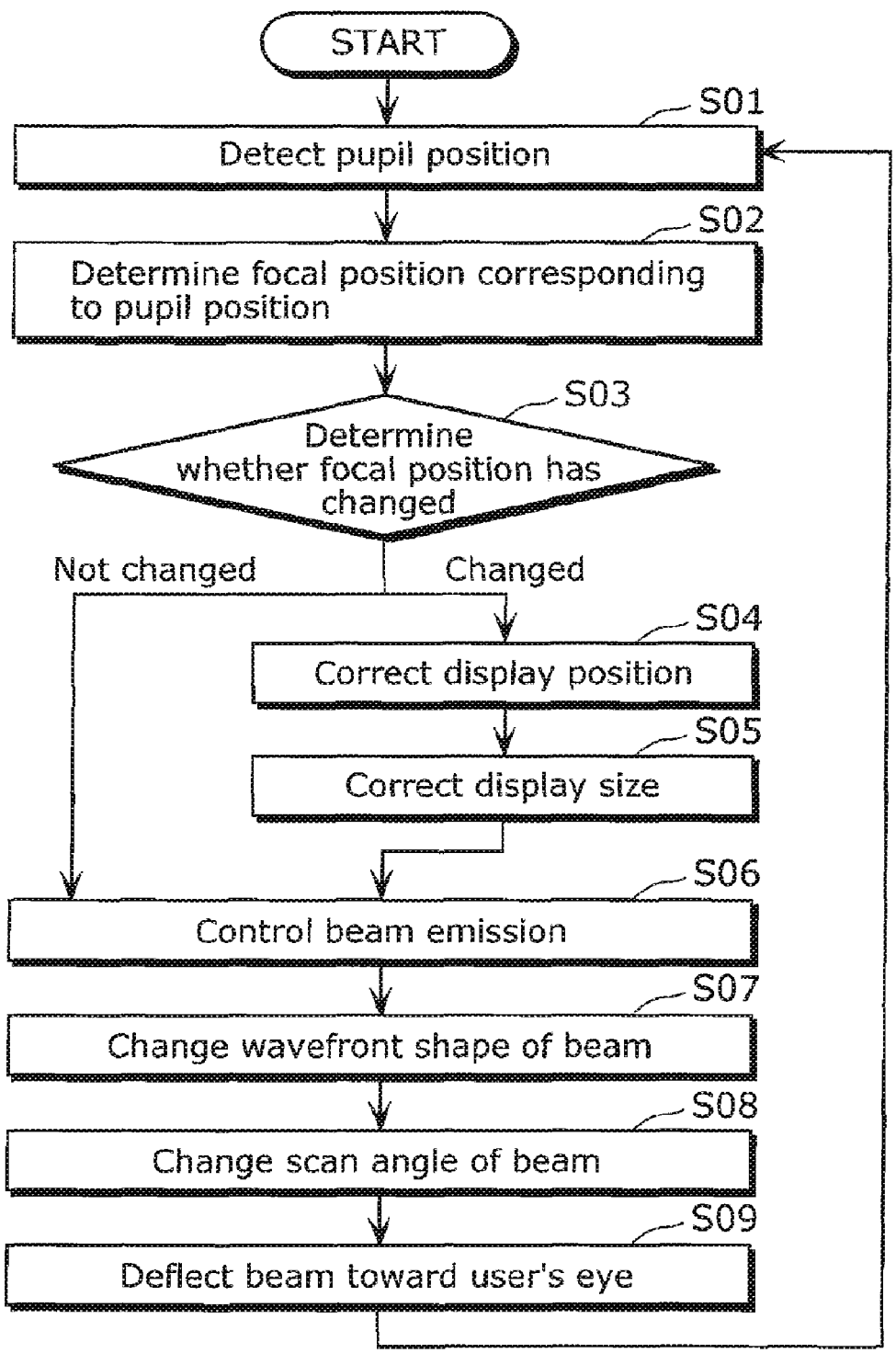
FIG. 16 is a flowchart showing operations of a display apparatus according to Embodiment 4.
Figure 17:
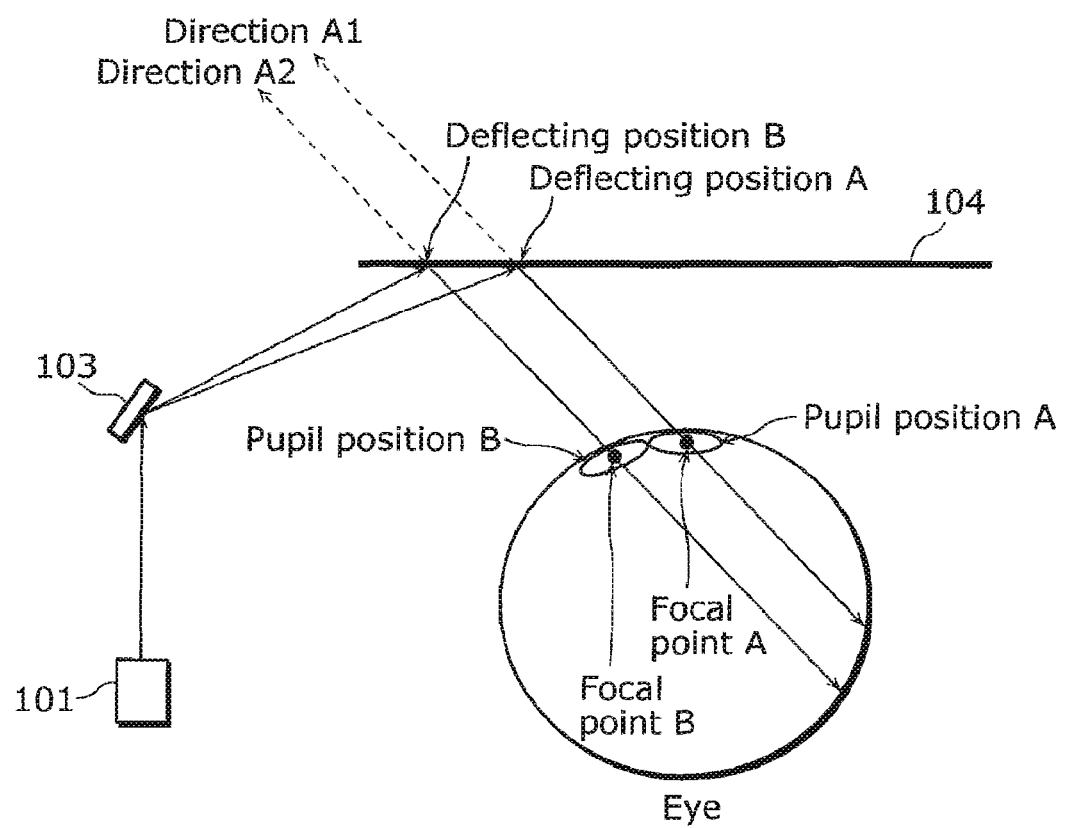
FIG. 17 illustrates an example of operations of a display apparatus, performed when a pupil position changes.

Described next with reference to FIGS. 16 and 17 is a procedure of operations performed by the display apparatus illustrated in FIGS. 1A and 1B for changing the display position and size of output images in such a direction that reduces changes in the position and size of display images caused by a switch between focal positions corresponding to the pupil position. It is to be noted that although only the processing for the left eye shall be described below, the same processing is necessary for the right eye.

(S01) The light detection unit 214 detects a pupil position. Then, the process proceeds to the operation in S02. The light detection unit 214 detects the intensity of light reflected from the user's eye. The cornea on the eye surface has an aspherical shape. Thus, reflected light with greater intensity can be detected only when a beam enters the eye from the front of the eye, because such a beam is perpendicularly incident on the cornea surface and is reflected off perpendicularly. Therefore, when reflected light with great intensity is detected, the pupil position detection unit 1051A of the control unit 105 can estimate that a beam is passing through the pupil center while being perpendicular to the pupil surface. The position and direction of the beam entering the user's eye can be calculated based on the scan angle of the scan unit 103 at the time point, thereby allowing the estimation of the pupil position using the reflected light.

The operation in S01 of detecting reflected light and the after-mentioned operation in S02 of detecting the user's line of sight with the reflected light may be performed by using reflection of a beam scanned by the scan unit 103 as illustrated in Embodiment 4, or by using reflection of light emitted from a light source different from that of the beam scanned by the scan unit 103. For example, Patent Reference 5 achieves detection of the user's line of sight by using an image sensor detecting reflection, from the user's eyes, of infrared light emitted from an infrared-light-emitting diode. Further, Patent Reference 6 achieves detection of the user's line of sight by using an image sensor detecting reflection, from the user's eyes, of a beam scanned by a scan unit.

It is to be noted that the intensity of light reflected from the eye may be expressed as a ratio between the intensity of emitted light which has been modulated by the light source 101 and the intensity of the light detected by the light detection unit 214. This reduces the impact of a change in the intensity of the emitted light, caused by a change in the displayed images. Further, while invisible light, such as infrared light, is scanned at a constant intensity, the reflection thereof may be detected. Furthermore, the focal point of infrared light deflected by the deflection unit 104 may be set at a position different from the focal point of visible light so that the position is appropriate for the detection of the pupil position. For example, the focal point of infrared light may be set at the center of the eyeball rotation. This allows detection of the reflected light independently of changes in the displayed images.

It is to be noted that instead of using the light detection unit 214, the pupil position may be detected using an image of the user's eye captured by a camera. In addition, the pupil position may be detected by detecting an electric signal transmitted from muscles used in the eyeball rotation. Moreover, an eyeball rotation may be induced by changing the information display position on the screen so as to allow estimation of the pupil position.

In addition to detecting the pupil position, the pupil size (diameter) may also be detected. The pupil size may be measured using light reflected from the pupil or iris, or estimated by detecting the brightness of the user's surrounding.

It is to be noted that the pupil position may be set to a predetermined value when the detection of the reflected light fails in S01. For example, in the case where the detection of the reflected light is impossible because no beams have been emitted yet, the pupil position may be set with a presumption that the user's line of sight is extending toward the screen center.

(S02) The pupil position detection unit 1051A of the control unit 105 determines a focal position corresponding to the pupil position. Then, the process proceeds to the operation in S03. Since plural focal positions are already determined at the time of designing the deflection units 104 and 107, the focal position closest to the pupil position detected in S01 is determined as "the focal position corresponding to the pupil position".

In the example illustrated in FIG. 17, the deflection unit 104 has two focal points, namely, focal points A and B. A beam incident on a deflecting position A is deflected towards both the focal points A and B, and a beam incident on a deflecting position B is also deflected towards both the focal points A and B. Here, when the pupil position A is detected in S01 as the pupil position, the focal point A is determined as the "corresponding focal position" in S02. When the pupil position B is detected as the pupil position, the focal point B is determined as the "corresponding focal position".

It is to be noted that a method other than selecting the focal position closest to the pupil position may be used. For example, when there are plural focal positions on the pupil, any one of them may be selected. When there is no focal position in the pupil, no focal position may be selected and the display may be suspended during that time.

(S03) The pupil position detection unit 1051A of the control unit 105 determines whether or not the focal position determined in S02 differs from a previously determined focal position. If different, the process proceeds to the operation in S04, and if the same, the process proceeds to the operation in S06. When the previous determination result cannot be obtained, it may be determined as "different" so as to proceed to the operation in S04.

(S04) The output image control unit 1052A of the control unit 105 corrects the display position of an image. Then, the process proceeds to the operation in S05. When the previous focal position differs from the current focal position, the output image control unit 1052A corrects the display position such that the image is incident in front of the user's head at the same angle as the previous one. To be more specific, in order that the beam for drawing pixels before the change in the pupil position and the beam for drawing the same pixels after the change in the pupil position are substantially parallel in an area toward the user's eye from the deflection unit 104, the output image control unit 1052A causes the light source 101 to output, in a shifted direction along which the user's pupil position has changed, beams for drawing each pixel.

In the example illustrated in FIG. 17, it is assumed that the deflecting position A is the deflecting position before the eyeball rotation, and the deflecting position B is the deflecting position after the eyeball rotation. When the user's eyeball rotates, the display position is corrected so that the image which has been displayed at the deflecting position A is displayed at the deflecting position B. This correction allows the image which has been viewable in a direction A1 from the pupil position A, to be viewable in a direction A2 that is the same as the direction A1, even from the pupil position B. Therefore, the misalignment of the image position caused by the eyeball rotation can be corrected.

It is to be noted that when the virtual screen is at the infinity distance in the direction A1, the direction A2 is the same as the direction A1; however, when the distance to the virtual screen is short, the display position is corrected by setting the direction A2 such that both the directions A1 and A2 extend toward the same point on the virtual screen.

It is to be noted that instead of the output image control unit 1052A, the scan angle control unit 1053A may perform the above processing. To be more specific, in order that the beam for drawing pixels before the change in the pupil positions and the beam for drawing the same pixels after the change in the pupil positions are substantially parallel in the areas toward the user's eyes from the deflection units 104 and 107, the scan angle control unit 1053A causes the scan units 103 and 108 to scan, in a shifted direction along which the user's pupil positions have changed, beams for drawing each pixel.

It is to be noted that when the user's head rotates, the display position may be changed according to the angle of the rotation. In such a case, the change in the display position may be a combination of the change in the display position according to the head rotation and the change in the display position according to the correction of the present invention.

(S05) The output image control unit 1052A of the control unit 105 corrects the display size of the image. Then, the process proceeds to the operation in S06. When the previous focal position differs from the current focal position, the output image control unit 1052A corrects the display size such that a viewing angle between two points on the image remains unchanged no matter to which focal position a change is made.

In the example illustrated in FIG. 17, assuming that the deflecting position A is the deflecting position before the eyeball rotation and the deflecting position B the deflecting position after the eyeball rotation, an enlarged display of the image which has been displayed so far is performed when the eyeball rotates. Since a distance B between the pupil position B and the deflecting position B is longer than a distance A between the pupil position A and the deflecting position A, enlargement of the display size by the ratio B/A allows the viewing angle between two points on the image to be unchanged even when the focal position A moves to the focal position B. Therefore, the change in the image size caused by the eyeball rotation can be corrected.

It is to be noted that either the display position correction in S04 or the display size correction in S05 may be performed alone. In addition, the processing may be shared by the output image control unit 1052A and the scan angle control unit 1053A. For example, the scan angle control unit 1053A may correct the display position in S04, and the output image control unit 1052A may correct the display size in S05.

Although FIG. 17 illustrates the example of deflecting, toward the focal points A and B, the beams scanned by a single scan unit 103, there may be plural scan units and light sources to correspond to plural focal points. This way, it is possible to separately control the image beams passing through the focal point A and the image beams passing through the focal point B, thereby allowing the operations in S04 and S05 to be simultaneously performed for the focal points A and B separately. As a result, even when the focal points A and B are both on the same pupil and an image displayed via the focal point A overlaps an image displayed via the focal point B, it is possible to make images in the overlapped portion match each other without misalignment. In addition, in order to reduce increased brightness resulting from the added luminance of the images in the overlapped portion, the luminance of the overlapped portion can be reduced by the light sources in advance. This way, the problem of increased brightness of the overlapped portion can be reduced.

(S06) The light source 101 controls the beam emission. Then, the process proceeds to the operation in S07. In the case where a correction has been made to the display position in S04 or to the display size in S05, the light source 101 controls the beam emission such that the image reflects the correction.

Through appropriate modulation of the intensities of the beams emitted from the red laser light source 211, blue laser light source 212, and green laser light source 213, the colors, chrominance, and luminance of pixels to be displayed on the retina are represented. In addition to the above emission control, correction control may be performed which takes into account the impact of the optical system which includes the components from the light source 101 up to the user's eye, such as the scan unit 103 and the deflecting unit 104.

For example, since the beams scanned by the scan unit 103 are obliquely incident on the deflection unit 104, the rectangular shape of the display area is distorted into a non-rectangular shape, such as trapezium. In view of the above, the light source 101 may control the laser emission in coordination with the scan unit 103 in such a manner that the shape of the display area is inversely corrected in advance to make the display area a rectangle.

It is to be noted that when the correction of the display position or size causes a part of the image to be outside the deflection area of the deflection unit 104, that part of the image may be excluded from the output. Further, in order to avoid such a situation of not outputting a part of an image, an image may be outputted in advance for only a part of the deflection area so that the image output can continue even after the correction is performed.

(S07) The wavefront shape change unit 102 changes the wavefront shape of the beam emitted from the light source 101 so that the beam spot size on the retina falls within a predetermined range. Then, the process proceeds to the operation in S08. Since the beam spot size on the retina varies depending on, for example, the positional relationship between the scan unit 103, the deflection unit 104, the pupil, and the retina, the wavefront shape of the beam is changed according to a change in the pupil position, the scan angle or the deflection unit position. For example, when it is desired to change the horizontal focal length of the wavefront shape, it is changed by altering the distance between the cylindrical lens and the mirror of the focal length horizontal component change unit 201 of the wavefront shape change unit 102. Likewise, when it is desired to change the vertical focal length of the wavefront shape, it is changed by the focal length vertical component change unit 202.

(S08) The scan unit 103 changes the scan angle of the beam processed by the wavefront shape change unit 102, by changing the tilt of the MEMS mirror. Then, the process proceeds to the operation in Step S09. In the case where the scan angle is changed by the scan angle control unit 1053A, the scan angle is set to the changed scan angle.

(S09) The deflection unit 104 deflects, toward the plural focal positions which have been set near the user's retina, the beam scanned by the scan unit 103. Then, the process proceeds to the operation in S01. The beam deflected due to the diffraction effect of the hologram mirror of the deflecting unit 104 passes through the pupil and reaches the retina to be perceived by the user as an image.

It is to be noted that the series of operations from S06 to S09 may be executed sequentially or concurrently. The order of executing these operations may be rearranged. As a result, the execution order can be appropriately set, taking into account delays of the operations performed by the respective units and differences between the units in the periods of time required from the beginning to the completion of the respective operations including a pre-process, the actual operation, and a post-process. Thus, it is possible to reduce the total length of process time.

Further, the frequency of executing the operations S01 to S05 may be different from the frequency of executing the operations S06 to S09. The execution of S09 may be followed by the operation in S06.

In addition, the operations from S01 to S09 may be operations involving probability. For example, changes in the focal position may be expressed in probabilities; for instance, the probability that the focal position has changed may be expressed as 50%. With this, even when a predicted value is uncertain, images can be displayed with an image quality higher than in the case of not performing the prediction.

With the above operations, images can be drawn on the retina of the user's eye with the display position and size corrected when the eyeball rotates.

FIG. 18 illustrates examples of a corrected display. When the pupil position has moved to the left with respect to the user's head, the display position of a heart, which is the displayed image, moves to the left and the display size thereof is enlarged. Likewise, when the pupil position has moved to the right, the heart moves to the right and the display size thereof is enlarged. With such correction of the display position and size, images can be presented to the user as though the image display position and size are unchanged even when the user's eyes move.

With the display apparatus of the present invention with the above structure and operations, in the case where the deflection units 104 and 107 deflect display light toward plural focal positions so as to adapt to changes in the pupil positions caused by an eyeball rotation, it is possible to reduce changes in the position or size of a displayed image, which occur when the focal positions corresponding to the pupil positions are switched to different focal positions. Further, since the changes in the position and size become more significant as the deflection units 104 and 107 are closer to the user's eyes, this structure allows the deflection units 104 and 107 to be placed near the eyes. Furthermore, as a result of solving the problem with providing the deflection units 104 and 107 with plural focal points as a countermeasure against the pupil misalignment, it is possible to provide an HMD having a larger screen with a wider angle of view, which is likely to cause the pupil misalignment.

In addition, although Embodiment 4 has illustrated the example in which the control is performed by the control unit 105, the control may be performed by the control unit 111, or shared between the two control units 105 and 111.

Embodiment 5

With reference to FIGS. 1A, 1B, and 2, a display apparatus according to Embodiment 5 of the present invention shall be described. It is to be noted that the structures illustrated in FIGS. 1A, 1B and 2 are common to those in Embodiment 1, and thus a description thereof shall be omitted. The display apparatus according to Embodiment 5 has such a structure that the user can continuously view images even when the sliding down of eyeglasses occurs.

Figure 19A:
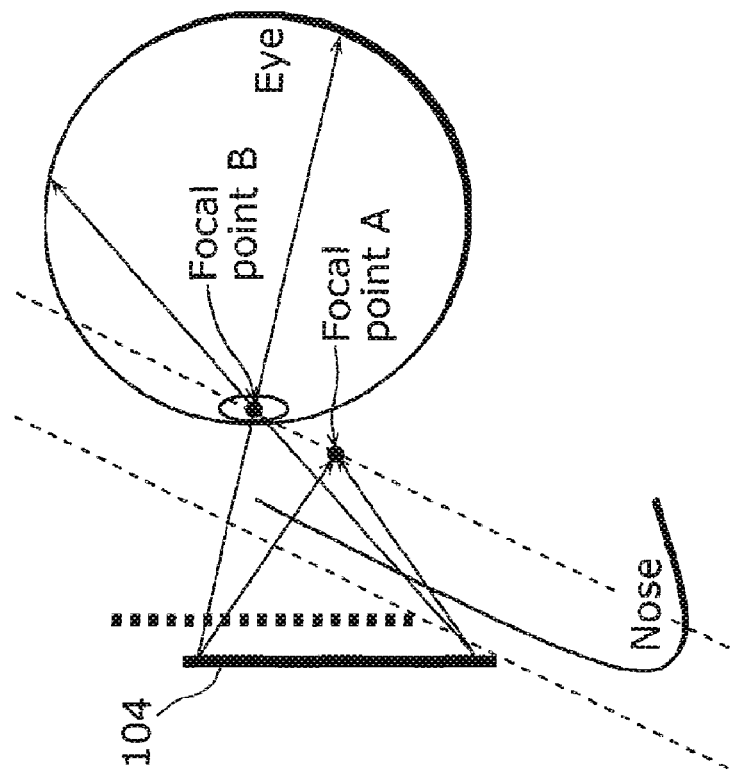
FIG. 19A illustrates a state in which a user wears a display apparatus according to Embodiment 5.
Figure 19B:
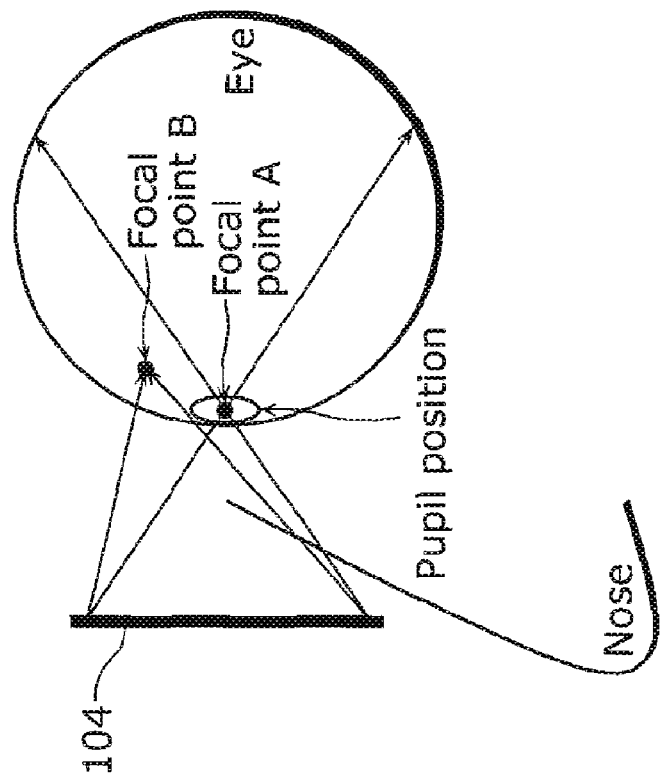
FIG. 19B illustrates a state in which a position of a deflection unit shifts downward from the position in FIG. 19A.

As illustrated in FIGS. 19A and 19B, the deflection unit 104 according to Embodiment 5 has plural focal points A and B as a countermeasure against the pupil misalignment caused by wearing the apparatus. The beams scanned by the scan unit 103 are deflected by the deflection unit 104 so as to pass through the focal points A and B. Thus, in FIG. 19A illustrating the state before the sliding down of eyeglasses, the beams passing through the focal point A make images viewable, whereas in FIG. 19B illustrating the state after the sliding down of eyeglasses, the beams passing through the focal point B make images viewable.

In FIG. 19B, due to the sliding down of eyeglasses, the deflection unit 104 of the lenses 121 and 122 of the eyeglasses moves downward and away from the eyeball, and this, as a result, causes a misalignment between the focal point A and the pupil position. Thus, the focal point B, which is located above the focal point A and is more distant from the deflection unit 104 than the focal point A, corresponds to the pupil position. As illustrated in FIG. 19B, the position of the focal point B is set such that the line connecting the focal points A and B is tilted along the direction of the shift of the deflection unit 104 caused by the sliding down of eyeglasses. In other words, the focal points A and B are on a straight line parallel to the ridge line of the user's nose.

Further, by setting the vertical distance between the focal points A and B equal to or longer than the pupil width (height) and setting the horizontal distance between the focal points A and B equal to or shorter than the pupil width, it is possible to reduce the occurrence of the situation where no beams enter the user's pupil from any of the plural focal points, while reducing the occurrence of the situation where plural beams from the plural focal points enter the user's pupil, when an eyeglass-type HMD moves downward with respect to the user's face.

Figure 20:
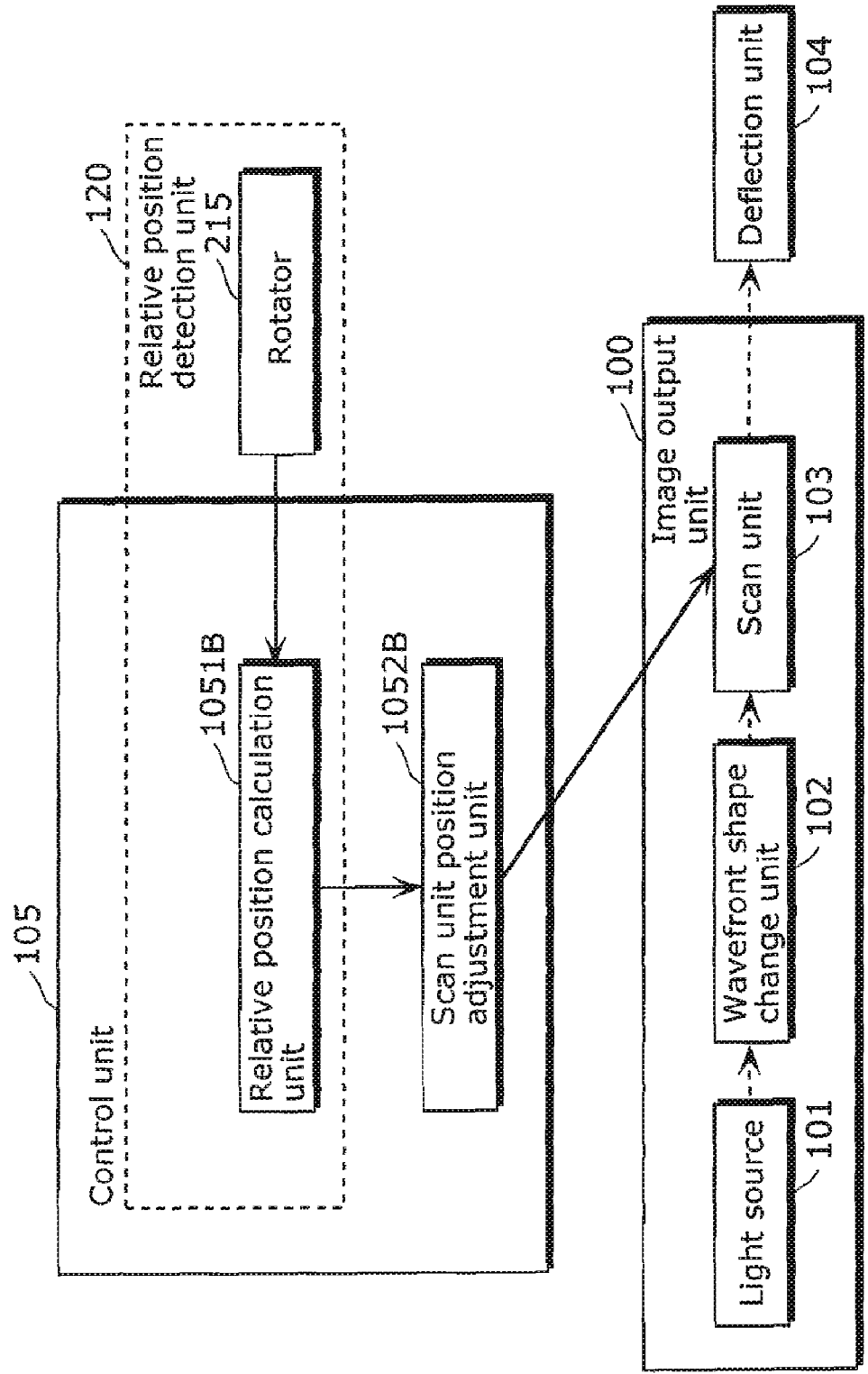
FIG. 20 is a functional block diagram of a display apparatus according to Embodiment 5.

It is to be noted that the focal position may be moved by shifting or rotating the deflection unit 104 or scan unit 103, instead of by providing the deflection unit 104 with plural focal points. For example, with reference to FIG. 20, another example of preventing the pupil misalignment caused by wearing the apparatus shall be described. FIG. 20 is a functional block diagram of a display apparatus according to Embodiment 5.

As illustrated in FIG. 20, the display apparatus includes a rotator 215, a relative position calculation unit 1051B, and a scan unit position adjustment unit 1052B. The rotator 215 is provided at a position to be in contact with the user's nose between the lenses 121 and 122. The relative position calculation unit 1051B and the scan unit position adjustment unit 1052B are included in the control unit 105.

The rotator 215 rotates as the deflection units 104 and 107 make a vertical movement. The relative position calculation unit 1051B detects, based on a rotation angle of the rotator 215, a change in relative positions of the user's pupil center and the deflection units 104 and 107. The rotator 215 and the relative position calculation unit 1051B constitute a relative position detection unit 120 which detects a change in the relative positions of the user's pupil center and the deflection units 104 and 107.

When the detection by the relative position detection unit 120 shows that the user's pupil center has moved from a position including a first focal point to a position including a second focal point, the scan unit position adjustment unit 1052B moves the positions of the scan units 103 and 108 such that the direction of the beams scanned by the scan units 103 and 108 on the deflection units 104 and 107, respectively, are changed from a first direction to a second direction different from the first direction.

The deflection units 104 and 107 in this case are holograms having a first interference pattern for focusing, at the first focal point, beams incident from the first direction, and a second interference pattern for focusing, at the second focal point, beams incident from the second direction. It is to be noted that in order to form plural interference patterns for the deflection units 104 and 107, multiple exposure of a photopolymer layer to plural combinations of an object beam and a reference beam, for example, is sufficient.

With the display apparatus having the above structure, the sliding down of eyeglasses is detected by the relative position detection unit 120. Then, based on the detection by the relative position detection unit 120, the scan unit position adjustment unit 1052B moves the relative positions of the scan units 103 and 108 and the deflection units 104 and 107, allowing the user to continuously view images.

This method does not require the deflection units 104 and 107 to simultaneously focus, at plural focal points, beams scanned by the scan units 103 and 108. Therefore, it is possible to avoid various problems that arise from the pupil having plural focal points at the same time.

It is to be noted that although Embodiment 5 illustrates drawing images by two-dimensionally scanning beams, the deflection units 104 and 107 may deflect beams so that display light from a two-dimensional image display device such as a liquid crystal is focused near the user's pupils (Maxwellian view).

With the above structure, the display apparatus of the present invention solves the problem of the pupil misalignment caused by wearing the apparatus even when the sliding down of eyeglasses occurs with an eyeglass-type HMD. As a result, the situation where images cannot be viewed is less likely to occur. Further, reducing the problem with the sliding down of eyeglasses makes it possible to provide a heavy HMD, an HMD whose weight balance is at its front (the lens portion), and an HMD having small contact areas near the user's nose or ears, all of which are relatively likely to cause the sliding down of eyeglasses. In addition, since problems with eyeglass-type HMDs can be reduced, HMDs can be eyeglass-type HMDs.

It is to be noted that the above embodiments are expected to produce a synergy effect when arbitrarily combined. Furthermore, application of the above embodiments for such use as below also produces beneficial effects. The application of the present invention is, however, not limited to the ones below.

Embodiment 6

Figure 21:
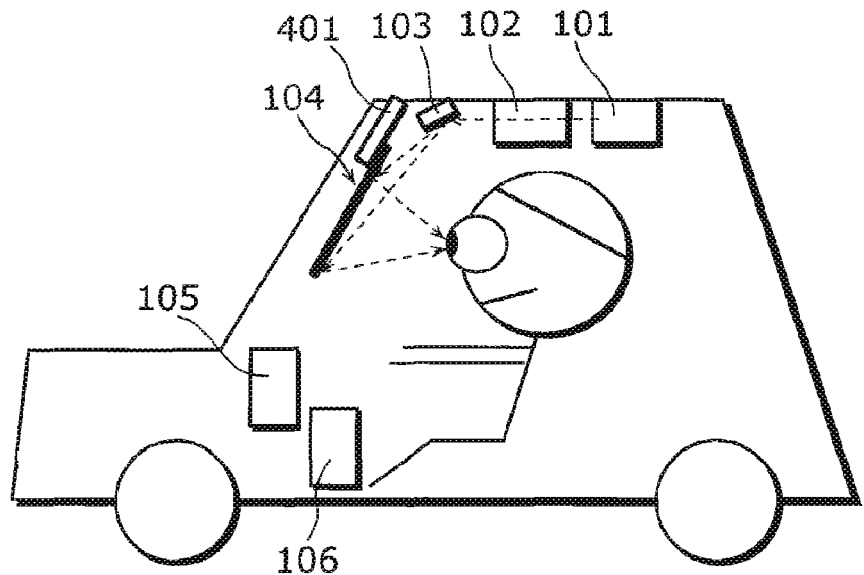
FIG. 21 illustrates an example of application of a display apparatus according to the present invention.

FIG. 21 is a structural diagram of a Head-up Display (HUD) for vehicles in Embodiment 6 of the present invention.

The HUD includes a light source 101, a wavefront shape change unit 102, a scan unit 103, a deflection unit 104, a control unit 105, and a headphone unit 106 which have the same basic structures as those in Embodiment 1, and thus operate in the same manner.

In Embodiment 6, images are displayed to a user in a vehicle. As in Embodiment 1, the deflecting unit 104 has characteristics of reflecting a beam and characteristics of transmitting visible light from outside the vehicle, which allow the user to view the display according to the present invention while seeing the views outside the vehicle. This allows the user to see information related to, for example, driving actions and a current location, such as a vehicle speed, a caution and alert, and navigation guidance, while seeing the views outside the vehicle.

As shown in FIG. 21, the light source 101, wavefront shape change unit 102, and scan unit 103 may be provided at positions around the ceiling of the vehicle. This prevents shielding the user's visual field seen through the window. Further, since they are provided at positions close to the user's eyes, the optical path is shortened, thereby enhancing the display precision. In addition, the HUD may be structured such that the light source 101 is provided at a position distant from the wavefront shape change unit 102, such as at the lower part of the vehicle, and beams are transmitted from the light source 101 to the wavefront shape change unit 102 via an optical fiber. This allows reduction in the size of the area on the ceiling, on which the light source 101 is to be provided.

The control unit 105 may be provided inside a dashboard of the vehicle. The control unit 105 may be integrated into a control apparatus other than the display apparatus according to the present invention. For example, the control apparatus may be a vehicle speed management apparatus or a guidance control apparatus (car navigation system). This allows a decrease in the total number of control apparatuses.

It is not necessary for the headphone unit 106 to be in contact with the user's ear, and the headphone unit 106 may be a speaker mounted on the interior surface of the vehicle around the user; for example, on a door or the front dashboard of the vehicle.

A deflection unit support unit 401 supports the deflection unit 104 from the ceiling or the upper portion of the window. The deflection unit support unit 401 has a positional adjustment function for adjusting the position and orientation of the deflection unit 104 according to the position of the user's head. The adjustment may be made automatically, or manually by the user. To make an automatic adjustment, a camera may be provided near the deflection unit support unit 401 to capture and recognize positional changes of the user's head, eyes, and so on, so that the adjustment is made by moving or rotating the deflection unit 104 to an appropriate position at an appropriate angle.

Embodiment 7

Figure 22:
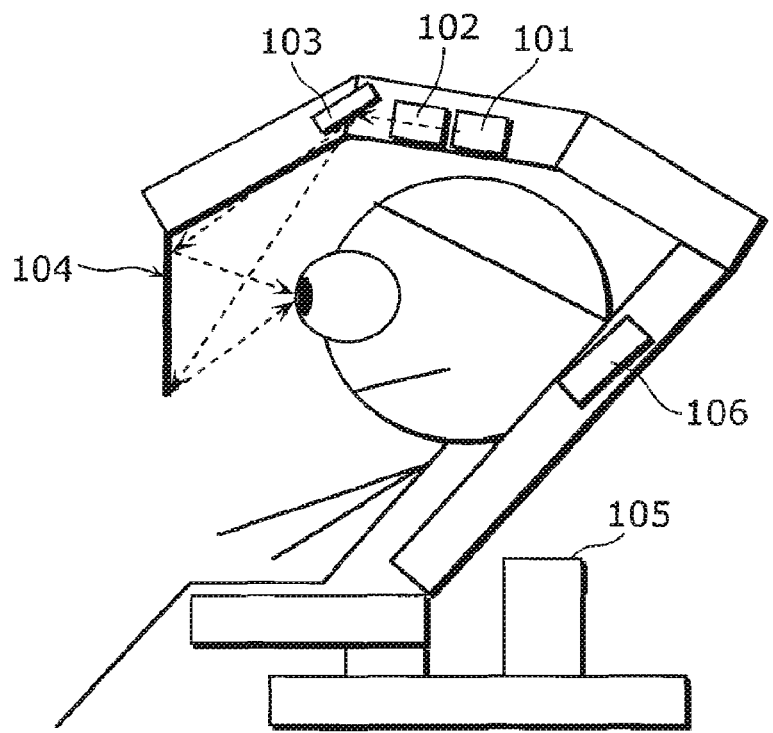
FIG. 22 illustrates another example of application of a display apparatus according to the present invention.

FIG. 22 is a structural diagram of a chair-type display apparatus in Embodiment 7 of the present invention.

The chair-type display apparatus includes a light source 101, a wavefront shape change unit 102, a scan unit 103, a deflection unit 104, a control unit 105, and a headphone unit 106 which have the same basic structures as those in Embodiment 1, and thus operate in the same manner.

In Embodiment 7, images are displayed to a user seated on a chair.

As shown in FIG. 22, the light source 101, wavefront shape change unit 102, and scan unit 103 may be provided on an area extending from the chair back to the deflection unit 104 in front of the user's eyes. In FIG. 22, they are provided above the user's head, but they may be provided near the user's temporal region or below the head.

The control unit 105 may be provided at the lower part of the chair. The control unit 105 may be integrated into a control apparatus other than the display apparatus according to the present invention. For example, the control apparatus may be a massage control apparatus. This allows a decrease in the total number of control apparatuses.

The headphone unit 106 may be a headphone in contact with the user's ear, or a speaker provided at the back or side of the user's head.

It is to be noted that the control processing in each of the embodiments described above is implemented by a CPU interpreting and executing predetermined program data that allows the execution of the above described procedures stored in a memory apparatus (a ROM, a RAM, a hard disk, and so on). In this case, the program data may be installed into the memory apparatus through a recoding medium, or may be directly executed from a recoding medium. It is to be noted that the recoding medium is, for example, a semiconductor memory such as a ROM, a RAM, and a flash memory; a magnetic disk memory such as a flexible disk and a hard disk; an optical disk such as a CD-ROM, a DVD, and a BD; and a memory card such as an SD card. In addition, the recording medium is a concept including a communication medium such as a phone line and a carrier route.

INDUSTRIAL APPLICABILITY

The display apparatus according to the present invention can reduce the adverse effect of pupil misalignment, and is applicable to a display apparatus, a display system, and a display method among others.

The invention claimed is:

1. A display apparatus that displays an image on a retina of a user, said display apparatus comprising:
    an image output unit which includes a light source which emits a beam for drawing each of pixels constituting the image, and a scan unit configured to two-dimensionally scan the beam emitted from said light source; and
    a deflection unit configured to deflect, toward an eye of the user, the beam outputted by said image output unit,
    wherein said deflection unit includes a left-eye deflection unit configured to deflect, toward the user's left eye, the beam scanned by said scan unit, and a right-eye deflection unit configured to deflect, toward the user's right eye, the beam scanned by said scan unit,
    said left-eye deflection unit has a deflection characteristic of deflecting the beam such that the beam scanned on a left deflection area which is on the left of a virtual line and the beam scanned on a right deflection area which is on the right of the virtual line are bilaterally asymmetric with respect to the virtual line in incidence angle at which the beams enter the user's pupil, the virtual line extending through a center of the user's pupil and being perpendicular to said left-eye deflection unit, and
    said right-eye deflection unit has a deflection characteristic of deflecting the beam such that the beam scanned on a left deflection area which is on the left of a virtual line and the beam scanned on a right deflection area which is on the right of the virtual line are bilaterally asymmetric with respect to the virtual line in incidence angle at which the beams enter the user's pupil, the virtual line extending through the pupil center and being perpendicular to said right-eye deflection unit.

2. A display apparatus that displays an image on a retina of a user, said display apparatus comprising:
    an image output unit which includes a light source which emits a beam for drawing each of pixels constituting the image, and a scan unit configured to two-dimensionally scan the beam emitted from said light source;
    a deflection unit configured to deflect, toward an eye of the user, the beam outputted by said image output unit;
    a light detection unit configured to detect light reflected from the user's pupil;
    a pupil position detection unit configured to detect a change in pupil position based on the detection by said light detection unit, the pupil position being a center position of the user's pupil; and a control unit configured to control output of said image output unit, wherein said deflection unit has a deflection characteristic of deflecting the beam scanned by said scan unit such that beams are focused on a first focal point and a second focal point different from the first focal point, and said control unit is configured to control the output of said image output unit such that a virtual image viewed by the user before a change in the pupil position and a virtual image viewed by the user after the change in the pupil position are seen in a same direction when the detection by said pupil position detection unit shows that the pupil position has moved from a position including the first focal point to a position including the second focal point.

3. The display apparatus according to claim 2, wherein said control unit is configured to control the output of said image output unit such that the beam for drawing pixels before the change in the pupil position and the beam for drawing same pixels after the change in the pupil position are substantially parallel in an area toward the user's eye from said deflection unit.

4. The display apparatus according to claim 3, wherein said control unit includes an output image control unit configured to cause said light source to emit, in a shifted direction along which the user's pupil position has changed, the beam for drawing each of the pixels, such that the beam for drawing the pixels before the change in the pupil position and the beam for drawing the same pixels after the change in the pupil position are substantially parallel in the area toward the user's eye from said deflection unit.

5. The display apparatus according to claim 4, wherein said output image control unit is further configured to control the output of said image output unit such that a size of the virtual image viewed by the user before the change in the pupil distance equals a size of the virtual image viewed by the user after the change in the pupil distance.

6. The display apparatus according to claim 3, wherein said control unit includes a scan angle control unit configured to cause said scan unit to scan, in a shifted direction along which the user's pupil position has changed, the beam for drawing each of the pixels, such that the beam for drawing the pixels before the change in the pupil position and the beam for drawing the same pixels after the change in the pupil position are substantially parallel in the area toward the user's eye from said deflection unit.

7. A display apparatus that displays an image on a retina of a user, said display apparatus comprising:

an image output unit which includes a light source which emits a beam for drawing each of pixels constituting the image, and a scan unit configured to two-dimensionally scan the beam emitted from said light source; and a deflection unit configured to deflect, toward an eye of the user, the beam outputted by said image output unit, wherein said deflection unit has a deflection characteristic of deflecting the beam scanned by said scan unit such that beams are focused on a first focal point and a second focal point different from the first focal point, the second focal point being above the first focal point with respect to the user and more distant from said deflection unit than the first focal point.

8. The display apparatus according to claim 7, wherein the first and second focal points are on a virtual line substantially parallel to a ridge line of the user's nose.

9. The display apparatus according to claim 8, wherein a vertical distance between the first and second focal points is equal to or longer than a height of the user's pupil and a horizontal distance between the first and second focal points is equal to or shorter than a width of the user's pupil.

10. The display apparatus according to claim 9, wherein said deflection unit is configured to simultaneously deflect, toward the first and second focal points, the beam scanned by said scan unit.

11. The display apparatus according to claim 9, further comprising:

a relative position detection unit configured to detect a change in relative positions of said deflection unit and a center of the user's pupil with respect to each other; and a scan unit position adjustment unit configured to move a position of said scan unit such that a direction of the beam scanned by said scan unit on said deflection unit changes from a first direction to a second direction different from the first direction when the detection by said relative position detection unit shows that the user's pupil center has moved from a position including the first focal point to a position including the second focal point, wherein said deflection unit is a hologram having a first interference pattern for focusing, at the first focal point, beams incident from the first direction, and a second interference pattern for focusing, at the second focal point, beams incident from the second direction.

12. The display apparatus according to claim 11, wherein said relative position detection unit includes:

a rotator which is provided at a position to be in contact with the user's nose, and which rotates when said deflection unit makes a vertical movement; and a relative position calculation unit configured to detect a change in the relative positions of said deflection unit and the user's pupil center based on a rotation angle of said rotator.

\* \* \* \* \*